(12) United States Patent
Horii et al.

(10) Patent No.: US 8,427,619 B2
(45) Date of Patent: Apr. 23, 2013

(54) LIQUID CRYSTAL DISPLAY UNIT

(75) Inventors: Masatoshi Horii, Yokohama (JP);
Takashi Sugiyama, Yokohama (JP);
Yoshihisa Iwamoto, Yokohama (JP);
Keiichi Hirata, Hachiouji (JP)

(73) Assignee: Stanley Electric Co., Ltd., Tokyo (JP)

( * ) Notice: Subject to any disclaimer, the term of this patent is extended or adjusted under 35 U.S.C. 154(b) by 890 days.

(21) Appl. No.: 12/237,997

(22) Filed: Sep. 25, 2008

(65) Prior Publication Data
US 2009/0086132 A1 Apr. 2, 2009

(30) Foreign Application Priority Data

Sep. 28, 2007 (JP) ................... 2007-254784
Nov. 29, 2007 (JP) ................... 2007-308631
Dec. 25, 2007 (JP) ................... 2007-332292

(51) Int. Cl.
*G02F 1/1343* (2006.01)
*G02F 1/1337* (2006.01)

(52) U.S. Cl.
USPC .................. 349/142; 349/130; 349/146

(58) Field of Classification Search .......... 349/142, 349/130, 146
See application file for complete search history.

(56) References Cited

U.S. PATENT DOCUMENTS

| | | | |
|---|---|---|---|
| 5,229,873 A | 7/1993 | Hirose et al. | |
| 6,522,379 B1 * | 2/2003 | Ishihara et al. | 349/139 |
| 7,057,686 B2 | 6/2006 | Ho et al. | |
| 7,463,321 B2 * | 12/2008 | Song et al. | 349/129 |
| 7,961,264 B2 * | 6/2011 | Liu et al. | 349/43 |
| 2004/0169777 A1 | 9/2004 | Tanaka et al. | |
| 2005/0237463 A1 * | 10/2005 | Kubo | 349/139 |
| 2008/0143907 A1 * | 6/2008 | Kim et al. | 349/43 |
| 2010/0110306 A1 | 5/2010 | Yamada | |

FOREIGN PATENT DOCUMENTS

| | | |
|---|---|---|
| CN | 1537256 A | 10/2004 |
| EP | 0 539 895 A1 | 5/1993 |
| JP | 4261522 A | 9/1992 |
| JP | 05-002161 A | 1/1993 |
| JP | 05-281559 A | 10/1993 |
| JP | 7-39076 U | 7/1995 |
| JP | 8-201832 A | 8/1996 |
| JP | 2000-250024 A | 9/2000 |

(Continued)

OTHER PUBLICATIONS

Samsung Electronics Co., Ltd., Nov. 15, 2003, Machine Translation from KIPO website of KR 2003-0087684, pp. 1-26.*

(Continued)

*Primary Examiner* — Edward Glick
*Assistant Examiner* — Dennis Y Kim
(74) *Attorney, Agent, or Firm* — Holtz, Holtz, Goodman & Chick, P.C.

(57) ABSTRACT

A liquid crystal display unit has: a pair of opposing substrates; an electrode pattern formed on each of the substrates on an opposing surface side; a vertical alignment film formed on each of the substrates and covering the electrode pattern; a liquid crystal layer squeezed between the substrates; and a pair of polarizer plates formed on the substrates on an opposite side to the side of said liquid crystal layer, wherein an edge of the electrode pattern includes a zigzag pattern parallel to one of axis directions of the polarizer plates and a direction perpendicular the axis direction. Optical through can be reduced along an edge portion of a pixel of a vertical alignment LCD.

7 Claims, 35 Drawing Sheets

TRANSMISSION (ABSORPTION) AXIS DIRECTION OF POLARIZER PLATE

TRANSMISSION (ABSORPTION) AXIS DIRECTION OF POLARIZER PLATE

FOREIGN PATENT DOCUMENTS

| | | | |
|---|---|---|---|
| JP | 2005-234254 A | | 9/2005 |
| JP | 2007-210341 A | | 8/2007 |
| JP | 2000-258764 A | | 9/2009 |
| KR | 2003-0087684 | * | 11/2003 |
| WO | WO 2009/022481 A1 | | 2/2009 |

OTHER PUBLICATIONS

Japanese Office Action dated Sep. 15, 2009 (1 page), and partial English translation thereof (2 pages), issued in counterpart Japanese Application Serial No. 2007-308631.

Partial translation of JP 5-5161, which was submitted to the USPTO in the IDS of Sep. 25, 2008.

Chinese Office Action dated Feb. 13, 2012 (and English translation thereof) in counterpart Chinese Application No. 200810166004.1.

Japanese Office Action dated Apr. 24, 2012 (and English translation thereof) in counterpart Japanese Application No. 2007-254784.

Chinese Office Action dated Sep. 14, 2012 (and partial English translation thereof) in counterpart Chinese Application No. 200810166004.1.

Japanese Office Action dated Jun. 26, 2012 and English translation thereof in counterpart Japanese Application No. 2007-332292.

* cited by examiner

3d - 1

3d - 2

TRANSMISSION (ABSORPTION) AXIS DIRECTION OF POLARIZER PLATE

TRANSMISSION (ABSORPTION) AXIS DIRECTION OF POLARIZER PLATE

TRANSMISSION (ABSORPTION) AXIS DIRECTION OF POLARIZER PLATE

LIQUID CRYSTAL DISPLAY UNIT

CROSS REFERENCE TO RELATED APPLICATION

This application is based on and claims priority of Japanese Patent Applications No. 2007254784 filed on Sep. 28, 2007, No. 2007-308631 filed on Nov. 29, 2007 and No. 2007-332292 filed on Dec. 25, 2007, the entire contents of which are incorporated herein by reference.

BACKGROUND OF THE INVENTION

A) Field of the Invention

The present invention relates to an apparatus using liquid crystal, and more particularly to a liquid crystal display unit.

B) Description of the Related Art

A vertical alignment liquid crystal display unit has a phenomenon that liquid crystal molecules are slanted in a horizontal direction because of an oblique electric field generated at edge portions of upper and lower electrodes having different shapes. This phenomenon occurs near at a threshold voltage. A vertical alignment liquid crystal display unit operates often in a normally black mode by using a pair of polarizer plates cross-Nicol disposed. An area of a liquid crystal display unit where this phenomenon occurs enters an optically transmissive state. In simple matrix driving applying an OFF voltage, a contrast ratio is lowered because of this optical through.

Japanese Utility Model Unexamined Publication No. HEI-7-39076 proposes to dispose a metal light shielding mask (black mask) covering pixel edge portions in order to prevent optical through (optical leakage) at pixel edge portions in a display OFF state.

A vertical alignment type liquid crystal display unit has a liquid crystal molecule alignment direction in a liquid crystal layer vertical to the substrate in the absence of applied voltage and has a very good black level in the absence of applied voltage. Of a liquid crystal cell constituting a vertical alignment type liquid crystal display unit, one or both upper and lower substrates have optical compensation plates having negative optical anisotropy disposed at proper positions so that the display unit has very good visual angle characteristics.

Orientation types of a vertical alignment type liquid crystal display unit include a mono-domain orientation formed by a rubbing process or the like and a multi-domain orientation formed by generating an oblique electric field by forming an opening in a pixel electrode to align liquid crystal molecules in a plurality of directions in the same plane parallel to the substrate.

Orientation control of a mono-domain vertical alignment type liquid crystal display unit is performed so that the in-plane alignment direction in a liquid crystal layer becomes uniform irrespective of whether a voltage is applied or not. In the vertical alignment type, liquid crystal molecules are slanted in a state parallel to the substrate in the presence of applied voltage. If liquid crystal molecules are perfectly vertical to the substrate in the absence of applied voltage, orientation defects are likely to occur which cause partial orientation disturbance of liquid crystal molecules in the presence of applied voltage. In order to avoid this, a pretilt angle is set so that liquid crystal molecules tilt slightly from the vertical direction relative to the substrate in the absence of applied voltage.

A vertical alignment liquid crystal display unit subjected to a rubbing process is proposed, for example, in JP-A-2005-234254.

In driving a mono-domain vertical alignment type liquid crystal display unit at a high duty ratio like dot matrix display, a drive voltage is determined based upon a transmissivity. In this case, an effective value of an OFF voltage is determined from an effective value of an ON voltage and a bias ratio. Under the high duty ratio driving conditions, the OFF voltage is in some cases higher than a threshold voltage at which liquid crystal molecules start falling. In this case, therefore, a transmissivity of liquid crystal changes even in the presence of applied OFF voltage, and optical through may be formed in a display unit. This optical through is desired to be avoided because a contrast ratio is lowered.

It is known that a change in voltage/transmissivity is made steep near the threshold voltage in order to prevent the optical through. One method for this is to perform a large pretilt angle orientation process of setting liquid crystal molecule angles near vertical relative to the substrate in order to raise the threshold voltage at which liquid crystal molecules start falling. Another method is to increase a so-called retardation of a liquid crystal cell.

An oblique electric field may be formed at edge portions of a display pattern of a liquid crystal display unit between upper and lower electrodes. Even if the above-described optical through preventing methods are incorporated, liquid crystal molecules applied with the oblique electric field start falling at a voltage lower than that at liquid crystal molecules in the central area of a display region so that optical through is observed.

Optical through causes not only a lowered contrast ratio but also degraded visual angle characteristics.

A liquid crystal display unit for segment display is used for numerical display with seven segments and mark display having a particular shape, and the like. Techniques of forming a black mask serving as a light shielding film in the whole background area of a segment display pattern are disclosed, for example, in JP-A-HEI-5-281559, JP-A-2000-250024 and JP-A-HEI-5-2161. HP-A-HEI-5-2161 describes that a black mask is formed in the background area of a dot display pattern even for dot matrix display.

As described in JP-A-HEI-5-2161, one of the effects of a black mask is that it is possible to suppress optical through to be caused by an oblique electric field generated near at edge portions of a display pattern. This optical through is likely to be formed particularly in a vertical alignment type liquid crystal display unit.

However, as a black mask is formed in the background area, there occurs a phenomenon (this is herein called crosstalk caused by black mask) that even if black display is given to the display pattern, the display pattern is viewed dim.

The crosstalk caused by a black mask occurs because a transmissivity of a display pattern cannot be set as compatibly low as that of the black mask, in any display mode of twisted nematic (TN), super twisted nematic (STN), vertical alignment (VA) and the like. This transmissivity difference becomes conspicuous as a view angle is slanted.

With reference to FIG. 35, description will be made on a schematic example of crosstalk caused by a black mask. FIG. 35 is a schematic plan view showing a display state of a 7-segment display unit of three digits. A black matrix is formed in the whole background area of the 7-segment display unit of three digits, and the background area is black. The 7-segment display unit of three digits displays "321" in white. In the 7-segment display unit, segments (indicated by hatched lines) in black display have a higher transmissivity than that of the background black mask forming area, and are viewed as if the segments are displayed dim.

SUMMARY OF THE INVENTION

An object of the present invention is to provide a vertical alignment liquid crystal display unit capable of suppressing optical through to be caused by an oblique electric field formed at edge portions of upper and lower electrodes.

According to one aspect of the present invention, there is provided a liquid crystal display unit comprising: a pair of opposing substrates; an electrode pattern formed on each of the substrates on an opposing surface side; a vertical alignment film formed on each of the substrates and covering the electrode pattern; a liquid crystal layer squeezed between the substrates; and a pair of polarizer plates formed on the substrates on an opposite side to the side of the liquid crystal layer, wherein an edge of the electrode pattern includes a zigzag pattern parallel to one of axis directions of the polarizer plates and a direction perpendicular to the axis direction.

A vertical alignment liquid crystal display unit can be provided which can suppress optical through to be caused by an oblique electric field formed at edge portions of upper and lower electrodes.

Another object of the present invention is to provide a vertical alignment type liquid crystal display unit capable of reducing optical through.

According to another aspect of the present invention, in the liquid crystal display unit of the first aspect, the axis directions of the pair of polarizer plates are cross-Nicol disposed, and the electrode pattern includes a segment electrode and a common electrode, a side constituting the electrode pattern is a zigzag pattern parallel or perpendicular to the axis directions of the polarizer plates, an edge of a pixel defined by the segment electrode and common electrode is parallel or perpendicular to the axis directions of said polarizer plates.

It is possible to provide a vertical alignment type liquid crystal display unit capable of reducing optical through.

Still another object of the present invention is to provide a liquid crystal display unit capable of suppressing crosstalk to be caused by a light shielding film such as a black mask.

According to still another aspect of the present invention, there is provided a liquid crystal display unit comprising: a first transparent substrate; a second transparent substrate facing the first transparent substrate; a first transparent electrode having a first plan shape and disposed on a plane of the first transparent substrate facing the second transparent substrate; a second transparent electrode having a second plan shape and disposed on a plane of the second transparent substrate facing the first transparent substrate; a liquid crystal layer squeezed between the first and second transparent substrates; and a stripe light shielding film formed along an edge of a display pattern defined as a superposed area of the first and second transparent electrodes in a display screen.

A transmissivity difference between a background and a display pattern in black can be reduced by using a stripe-shaped light shielding film extending along an edge of a display pattern more than forming a light shielding film in the whole background area of a display pattern.

DESCRIPTION OF THE PREFERRED EMBODIMENTS

Description will now be made on the first to seventh embodiments and the first to third comparative examples.

Figure 1:
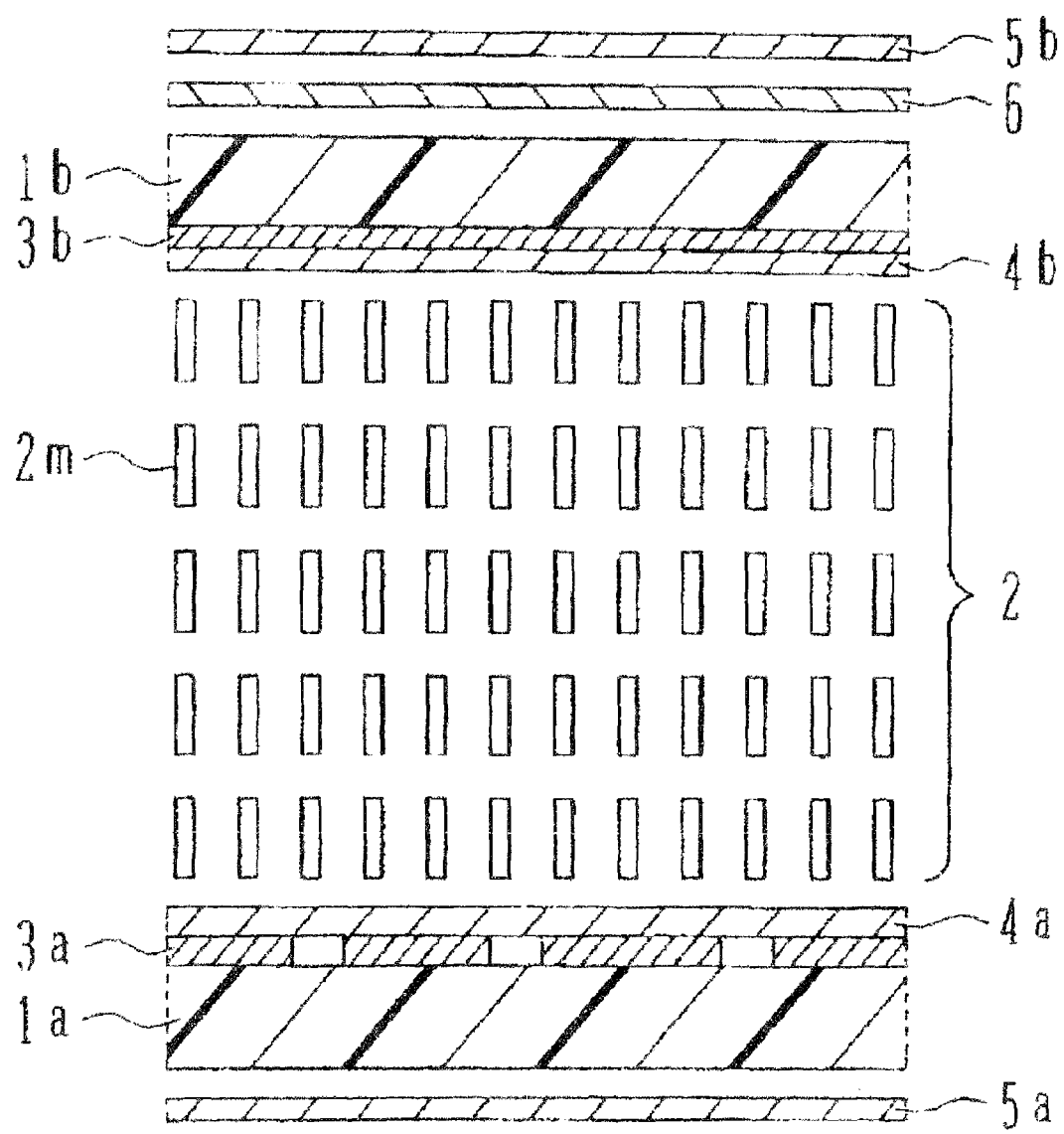
FIG. 1 is a schematic cross sectional view of a liquid crystal display unit.

FIG. 1 is a schematic cross sectional view of a liquid crystal display unit. The liquid crystal display unit shown has a back substrate 1a made of glass and a front substrate 1b made of glass and facing the back substrate, and a liquid crystal layer 2 is provided between both the substrates 1a and 1b.

Back transparent electrodes 3a serving as segment electrodes are formed on the surface of the back substrate 1a on the liquid crystal layer 2 side, and front transparent electrodes 3b serving as common electrodes are formed on the surface of the front substrate 1b on the liquid crystal layer 2 side.

Both the transparent electrodes 3a and 3b are superposed one upon another with the liquid crystal layer 2 being sandwiched therebetween, and this superposed area forms a display area.

Vertical alignment films 4a and 4b are formed covering the transparent electrodes, on the substrates 1a and 1b on the liquid crystal layer 2 sides, respectively. An insulating film may be formed when necessary between the vertical alignment film and transparent electrode.

A pair of polarizer plates 5a and 5b is formed outside the upper and lower substrates 1a and 1b along the normal direction. The polarizer plates 5a and 5b are disposed to cross their axis directions at 90°. If necessary, an optical compensation plate 6 may be disposed between the substrate and polarizer plate (e.g., between 1b and 5b).

Description will be made on a manufacture method for the liquid crystal display unit. The transparent electrodes 3a and 3b are formed being made of essentially indium tin oxide ITO on both the substrates 1a and 1b.

The vertical alignment films 4a and 4b are coated and baked, covering the transparent electrodes 3a and 3b, respectively. SE1211 manufactured by Nissan Chemical Industries, Ltd. was used as vertical alignment film material. A pretilt of 89.5° is given to the vertical alignment films by rubbing or the like. Rubbing is performed to set antiparallel in the 12 o'clock direction and 6 o'clock direction between the upper and lower substrates. Controlling a tilt direction of liquid crystal molecules may be performed by slit alignment, projection alignment, ultraviolet light alignment or the like.

Next, main seal material is coated on each substrate 1a, 1b, gap control material having a predetermined diameter (in this example, 4 μm) is sprayed, and thereafter both the substrates are superposed facing each other on the electrode sides and the main seal material is cured to thereby form an empty cell.

Liquid crystal is injected into the empty cell to form the liquid crystal layer 2. Liquid crystal material has $\Delta\in = -3.2$ and $\Delta n$ of about 0.15. Liquid crystal molecules 2m in the liquid crystal layer 2 are vertically aligned by the functions of the vertical alignment films. If liquid crystal material has negative dielectric anisotropy, other physical values and a cell thickness are not limited specifically.

Thereafter, the back polarizer plate 5a is bonded to the outer side (lower side in FIG. 1) of the back substrate 1, and the front polarizer plate 5b and optical compensation plate 6 stacked thereon are bonded to the outer side (upper side in FIG. 1) of the front substrate 2. SIIC-125U manufactured by Polatechno Co. Ltd is used as the polarizer plate. The optical compensation plate 6 may be a C plate (an in-plane retardation $\Delta R=0$ nm, a thickness retardation $\Delta th=220$ nm). Instead of the C plate, an A plate, a biaxial phase difference plate or the like may be used as the optical compensation plate 6.

Figure 2:
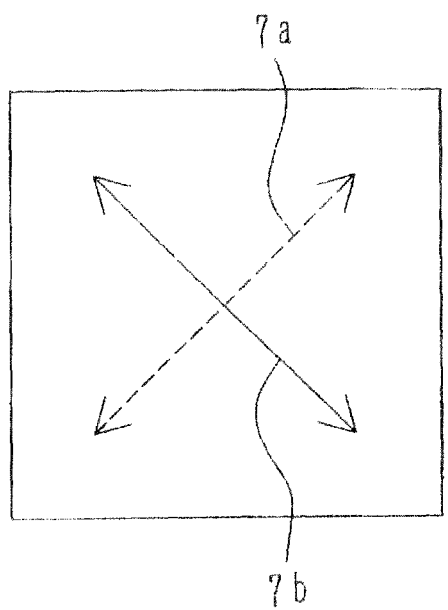
FIG. 2 is a plan view showing transmission axes of polarizer plates of a liquid crystal display unit.

FIG. 2 is a plan view showing the directions of transmission axes of the polarizer plates of a liquid crystal display unit. As shown, a (transmission) axis direction 7a of the back polarizer plate 5a is perpendicular to a (transmission) axis direction 7b of the front polarizer plate 5b (a pair of polarizer plates having this arrangement is called cross polarizers), providing a normally black liquid crystal display unit. Assuming that a right direction is 0 degree and a counter-clockwise rotation has a positive angle, the axis direction 7a is 45° and the axis direction 7b is 135°.

Figure 3:
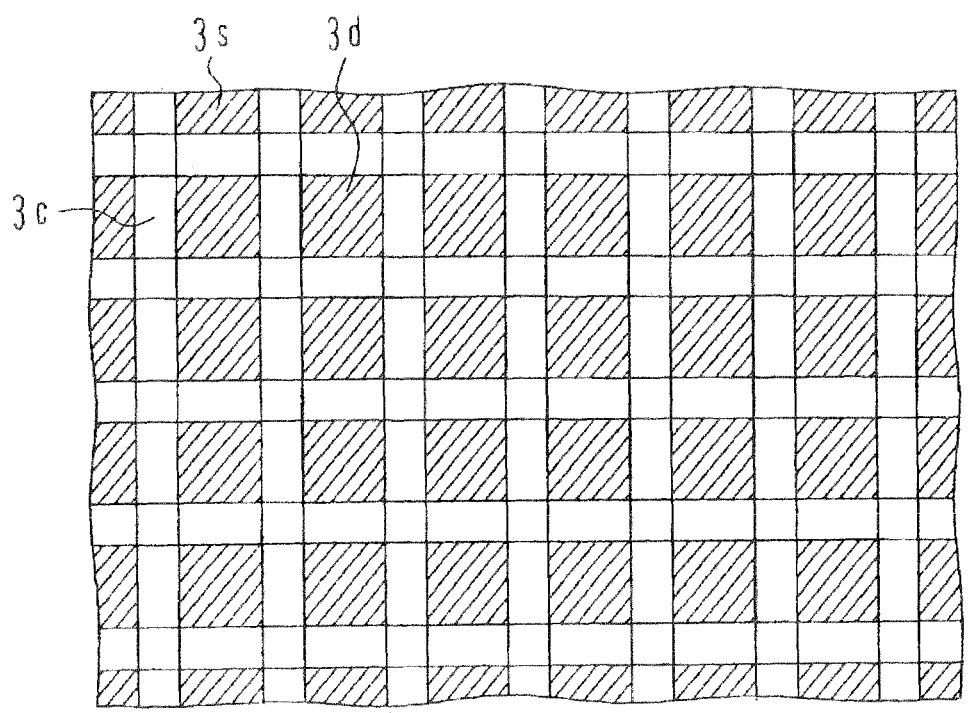
FIG. 3 shows an example of an electrode structure of a liquid crystal display unit of a simple matrix type.

FIG. 3 shows an example of the electrode arrangement of a simple matrix type of a liquid crystal display unit. In the simple matrix type liquid crystal display unit, common electrodes 3c juxtaposed in a column direction and segment electrodes 3s juxtaposed in a row direction define pixels 3d. Each pixel can independently perform bright/dark display by simple matrix driving.

FIRST COMPARATIVE EXAMPLE

Figure 4A:
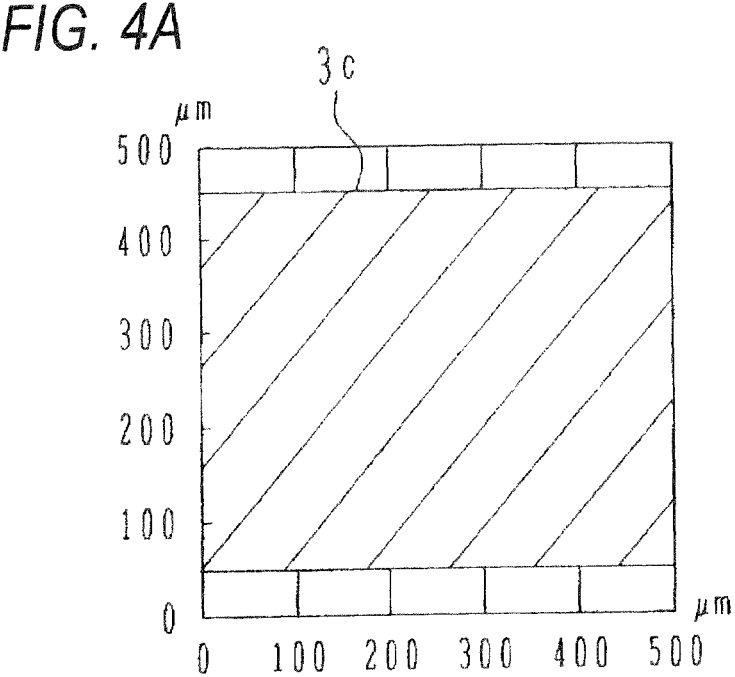
FIG. 4A shows a shape of a partial area of a common electrode.
Figure 4B:
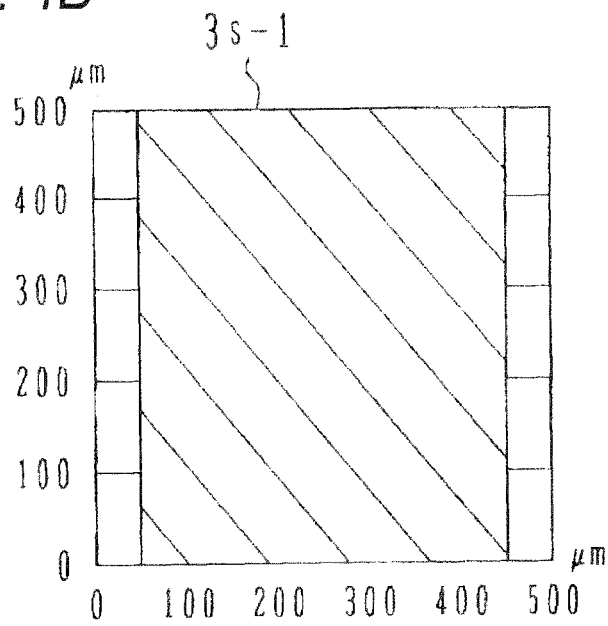
FIG. 4B shows a shape of a partial area of a segment electrode.

FIG. 4A shows the shape of a partial area of a common electrode, and FIG. 4B shows the shape of a partial area of a segment electrode. The present inventors made simulation by using special software, as to how the pixel is displayed by combining a common electrode 3c having a vertical length of 400 μm and a horizontal length of 500 μm shown in FIG. 4A and a segment electrode 3s-1 having a vertical length of 500 μm and a horizontal length of 400 μm shown in FIG. 4B.

Figure 5:
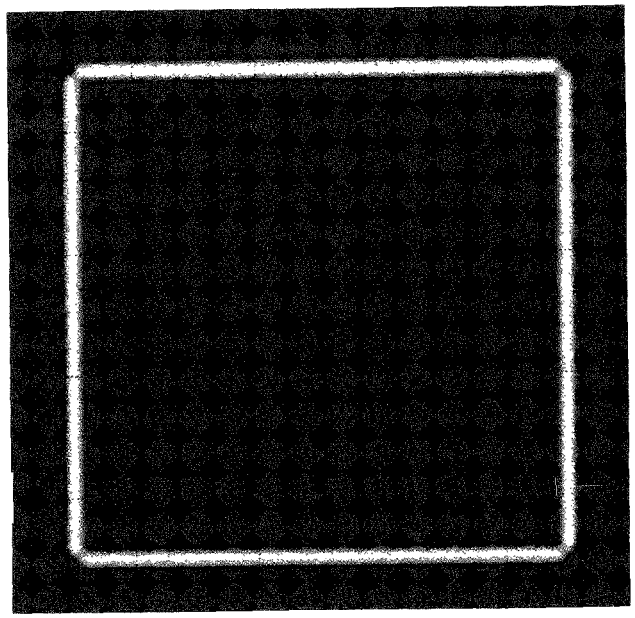
FIG. 5 shows a bright/dark distribution of a pixel in the presence of applied non-select voltage.

FIG. 5 shows a bright/dark distribution of a pixel in the presence of applied non-select voltage. The presence of applied non-select voltage means the state that an OFF voltage is applied across the common electrode and segment electrode. FIG. 5 shows an optical transmission state of the pixel in the presence of applied non-select voltage in the form of bright/dark distribution. A pixel 3d-1 corresponds to a pixel to be displayed when a common electrode 3c and a segment electrode 3s-1 are superposed one upon the other.

As the segment electrode 3s-1 is used, the pixel 3d-1 has optical through in its peripheral area as shown. The in-plane direction of a fringe electric field is possibly 0° and 90°. It can be considered that optical through occurs when liquid crystal molecules start falling in the oblique direction relative to the polarizer plate transmission axes of 45° and 135°. Optical through occurs in an area of about 10 μm around the pixel edge as its center. Optical through is desired to be eliminated since a high contrast ratio is required by shielding light in the presence of applied non-select voltage.

(First Embodiment)

Figure 6:
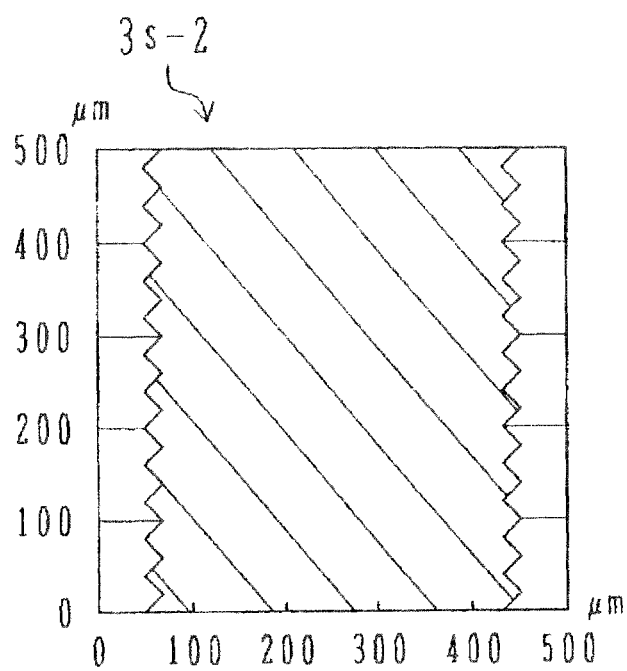
FIG. 6 shows the shape of a segment electrode according to a first embodiment.

FIG. 6 shows the shape of a segment electrode according to the first embodiment. In order to prevent optical through, the inventors have studied (simulated) a segment electrode 3s-2 having a zigzag pattern (saw tooth pattern) at right/left edges. Each side of the saw tooth is parallel to one of the polarizer plate axis directions 7a and 7b. A pitch of saw teeth is 20 μm.

Figure 7:
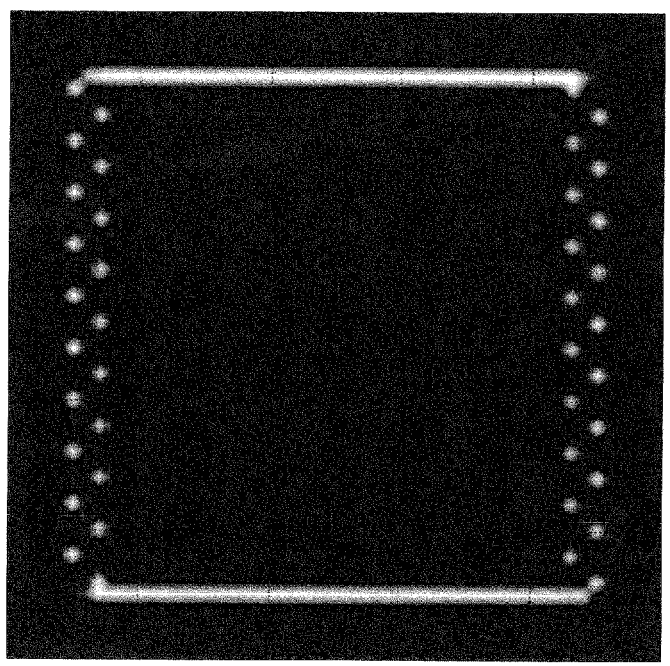
FIG. 7 shows a bright/dark distribution of a pixel $3d$-$2$ in the presence of applied non-select voltage, in a combination of a common electrode and a segment electrode having right and left zigzag pattern edges.

Reference is made to FIG. 7. FIG. 7 shows a bright/dark distribution in the presence of applied non-select voltage when the common electrode is combined with the segment electrode having right/left zigzag pattern edges. As shown, optical through is viewed only at apexes of the zigzag pattern in right/left areas of the pixel.

In this embodiment, if a side of the segment electrode is in a 45° direction, a fringe electric field is considered to be generated in an in-plane 135° direction. This fringe electric field is parallel to one of the axis directions of the polarizer plates. It is considered that there are various direction components at each apex. Occurrence of optical through can thus be suppressed, for example only at apexes of the zigzag pattern of the electrode if the electrode is made parallel the electrode side, fringe electric field, one of the polarizer plate axis directions and its perpendicular direction.

The inventors have studied next an optimum range of a pitch of saw teeth to be applied to a practical pixel.

Figure 8A:
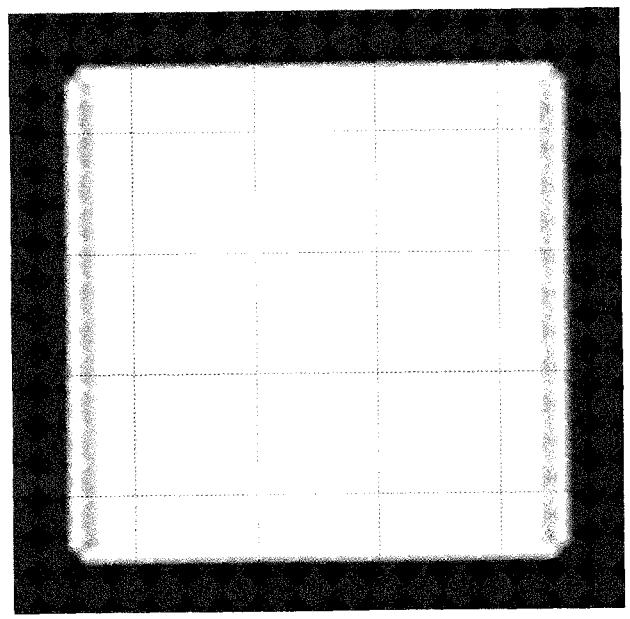
FIGS. 8A and 8B show bright/dark distributions of pixels in the presence of applied select voltage.
Figure 8B:
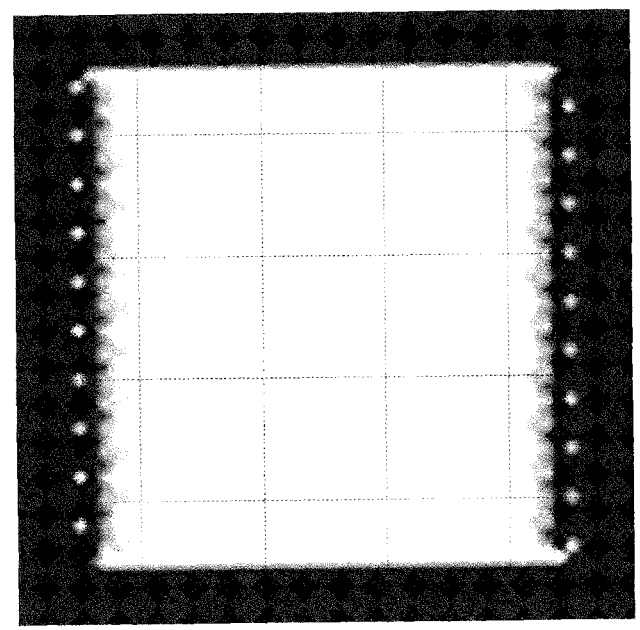

FIGS. 8A and 8B show bright/dark distributions in the presence of applied select voltage. The presence of applied select voltage means a state that an ON voltage is applied across electrodes. A pixel 3d-1 as a comparative example shown in FIG. 8A displays a square which can be said as an ideal shape of a pixel. A pixel 3d-2 shown in FIG. 8B has a pitch of 20 μm of the zigzag pattern. Although zigzag patterns are recognized at right/left sides in FIG. 8B, this pattern level poses practically no problem as the pixel is viewed at a normal distance (e.g. at a remote position by several ten cm). It has been found from the studies by the prevent inventors that there is no problem if a saw tooth pitch is 40 μm or shorter.

A lower limit of a saw tooth pitch is determined from a manufacture limit. A proper lower limit of the saw tooth pitch may be 2 μm when it is considered that zigzag patterns are formed by using a general manufacture system.

A saw tooth pitch range applicable to embodiments is therefore 2 μm to 40 μm.

Zigzag patterns may be formed only on the segment electrode side, only on the common electrode side, or on both the sides.

(Second Embodiment)

Figure 9:
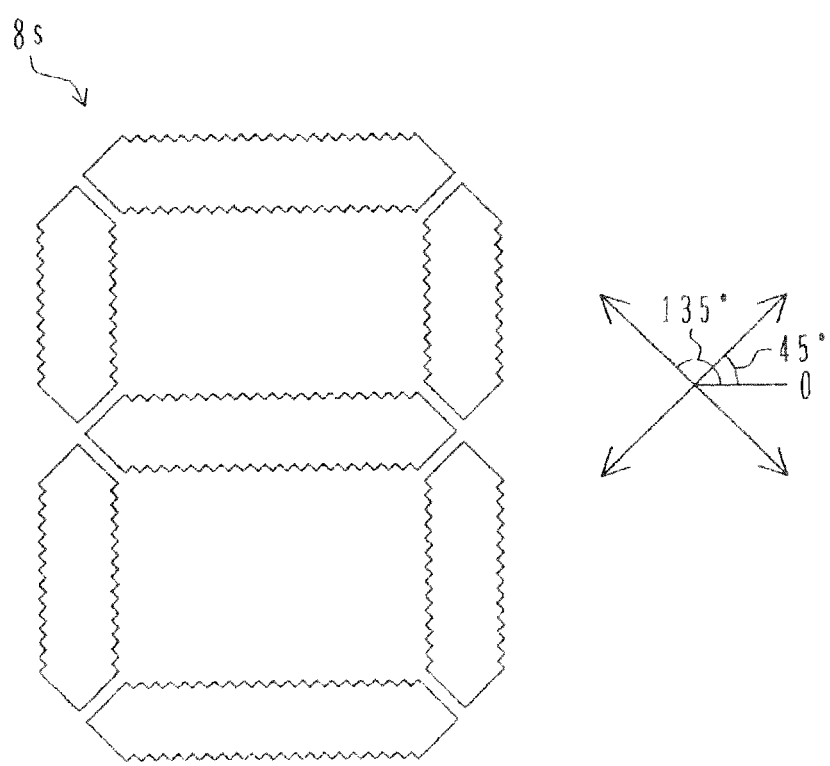
FIG. 9 shows another example of an electrode shape according to a second embodiment.

FIG. 9 shows another example of the shape of an electrode according to the second embodiment. FIG. 9 shows an example of a liquid crystal display unit of a segment type for displaying "8" with seven segments. This segment electrode faces a common electrode covering the segment area as viewed in plan. An oblique electric field is therefore generated between edge portions of the segment electrode and common electrode. It is herein assumed that the polarizer plates are cross-Nicol disposed with their axis directions of 45° and 135°. As a countermeasure for preventing optical through, a zigzag pattern similar to that of the first embodiment is formed at each of vertical and horizontal sides of the segment electrode 8s so as to make each oblique side be set to 45° or 135°. It is therefore expected that optical through in the presence of applied non-select voltage can be reduced considerably.

Liquid crystal display units were manufactured based upon the above-described simulation results.

SECOND COMPARATIVE EXAMPLE

The second comparative example is a mono-domain vertical alignment type liquid crystal cell having the electrode pattern of the first comparative example. An electrode width on the segment and common sides per one segment was set to 405 μm, and a width between electrodes was set to 30 μm. A segment electrode of ITO serving as a transparent conductive film was disposed on a lower substrate, and a common electrode of ITO was disposed on an upper substrate. A pretilt of 89.5° was given to vertical alignment films by an alignment process such as rubbing. Antiparallel alignment was incorporated by setting an azimuth angle direction of the pretilt of the lower substrate to the 12 o'clock direction (a position at 90° in the counterclockwise direction from the right at 0°. An up direction in FIG. 1), and an azimuth angle direction of the pretilt of the upper substrate to the 6 o'clock direction. In this case, a liquid crystal director is the 12 o'clock direction and an optimum visual recognition direction is the 6 o'clock direction. A cell thickness was 6 μm. Negative liquid crystal having $\Delta\epsilon=-2.2$ and $\Delta n=0.20$ was used as liquid crystal material. The polarizer plates were disposed at an absorption axis angle of 45° on the upper plate side and at an absorption axis angle of 135° on the lower plate side. SHC-13U manufactured by Polatechno Co. Ltd. was used as the polarizer plates. Three C plates ($\Delta R=0$ nm, $\Delta th=220$ nm) stacked were inserted as the optical compensation plate between the lower polarizer plate and liquid crystal cell. $\Delta R$ is an in-plane retardation value, and $\Delta th$ is a thickness direction retardation value.

As a drive waveform, a B waveform was used whose polarity is reversed for each frame (frame reversal driving). The drive conditions were a 1/32 duty, a 1/6 bias and a drive frequency of 150 Hz. Voltage/transmissivity characteristics along a liquid crystal cell normal direction (front direction) were measured with a liquid crystal cell evaluation apparatus LCD-5200 manufactured by Ohtsuka Electronics Co., Ltd.

Various electrode patterns were formed and liquid crystal display units were manufactured.

(Third Embodiment)

Figure 10:
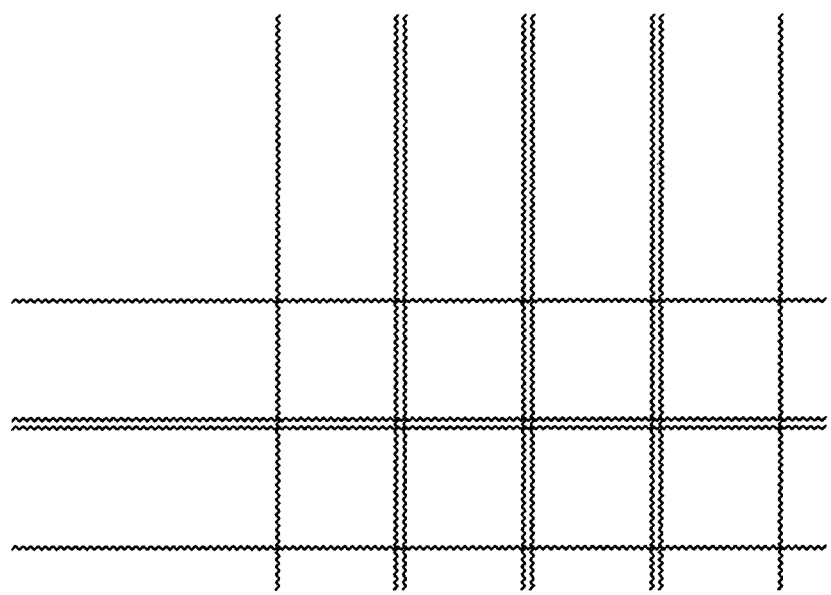
FIG. 10 shows an electrode pattern according to a third embodiment.

FIG. 10 shows electrode patterns of the third embodiment. The segment electrode of the third embodiment had an edge pattern constituted of zigzag lines at 45° and 135° added to the segment electrode of the second comparative example. A distance (pitch) between two apexes of the zigzag pattern was 20 μm and a height of an apex was 10 μm. Similar to the segment electrode the common electrode had also an edge pattern constituted of zigzag lines at 45° and 135°. A pitch and height of the zigzag pattern are the same as those of the segment electrode.

(Fourth Embodiment)

Figure 11:
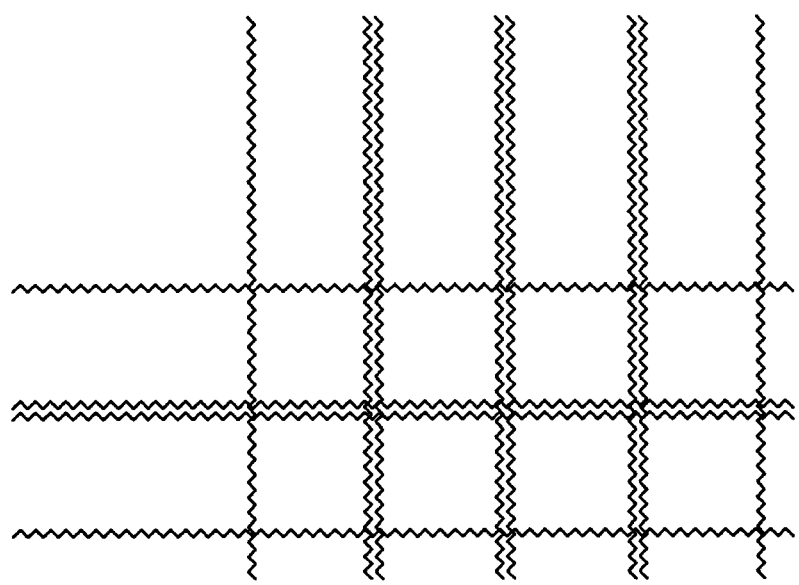
FIG. 11 shows an electrode pattern according to a fourth embodiment.

FIG. 11 shows an electrode pattern of the fourth embodiment. Similar to the electrode pattern of the third embodiment, edges of the segment and common electrodes had zigzag lines at the same angles as those of the third embodiment. Different points reside in the pitch and height of the zigzag pattern set to a pitch of 40 μm and a height of 20 μm.

(Fifth Embodiment)

Figure 12:
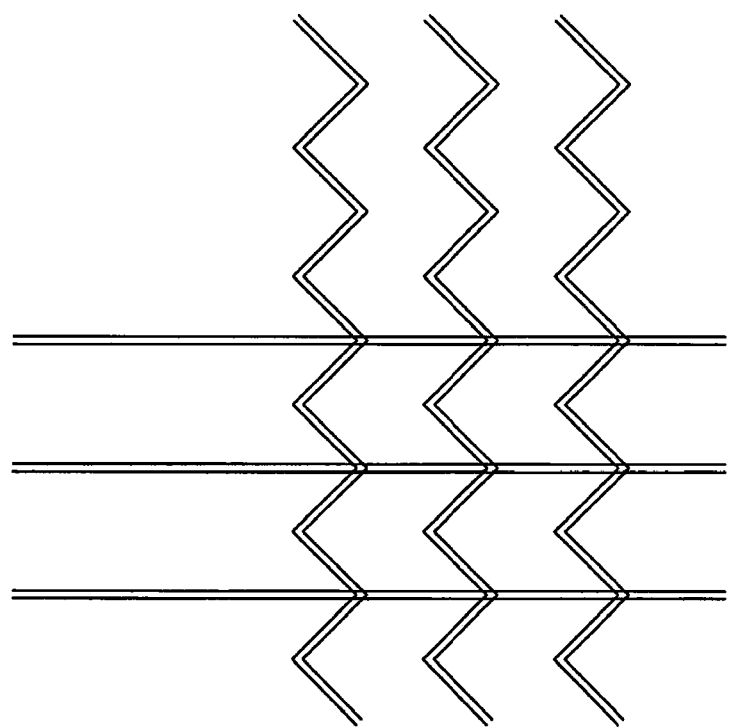
FIG. 12 shows an electrode pattern according to a fifth embodiment.

FIG. 12 shows an electrode pattern of the fifth embodiment. Similar to the electrode pattern of the third embodiment, the edge pattern of the segment electrode is constituted of zigzag lines at 45° and 135°, and the number of apexes occupied in one dot was reduced. A straight line pattern same as that of the first comparative example was used for the common electrode. Similar to the second comparative example, a segment electrode width (a length in the horizontal direction in FIG. 12) was 405 µm, and a distance between adjacent electrodes was set to 30 µm. The segment electrode had a shape that the segment electrode was bent at two positions at the center line of the common electrode and at the center line of the distance between adjacent common electrodes, and the pitch and height of the zigzag pattern were 435 µm and 217.5 µm, respectively. The electrode pattern in the area where both the electrodes were superposed had a "dogleg" shape.

(Sixth Embodiment)

Figure 13:
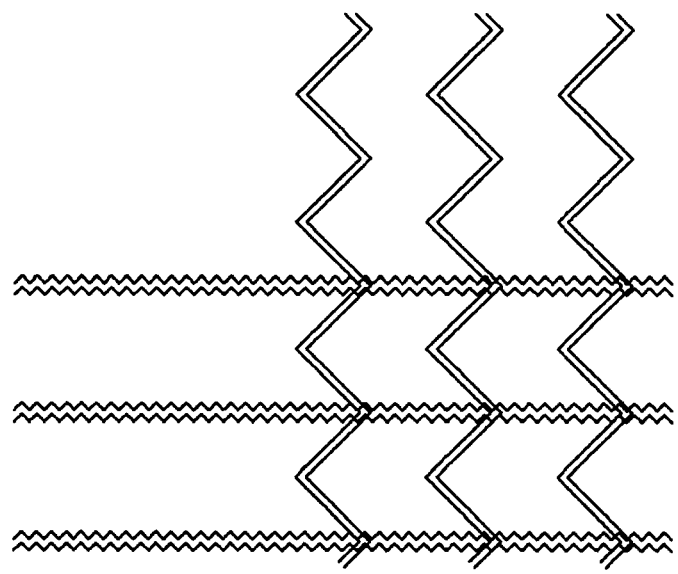
FIG. 13 shows an electrode pattern according to a sixth embodiment.

FIG. 13 shows an electrode pattern of the sixth embodiment. The sixth embodiment had the same pattern as that of the fifth embodiment in which the edge pattern of the segment electrode was constituted of oblique lines at 45° and 135°. A pitch and height of the zigzag patten were 435 µm and 217.5 µm, respectively. The common electrode had the zigzag pattern having a pitch of 50 µm and a height of 25 µm, similar to that of the third embodiment. The electrode pattern in the area where both the electrodes were superposed had a "dogleg" shape. Liquid crystal display units of the third to sixth embodiments were manufactured in quite the same manner as that of the second comparative example, excepting the electrode pattern. Voltage/transmissivity characteristics were measured also under the same drive conditions.

Table 1 shows the measurement results of a highest contrast value and its corresponding ON transmissivity.

TABLE 1

Highest contract value and its corresponding ON transmissivity under driving at a 1/32 duty and a 1/6 bias

|  | Highest contrast | ON transmissivity (%) |
| --- | --- | --- |
| Second comparative example | 260 | 11.9 |
| Third embodiment | 295 | 12.0 |
| Fourth emlodiment | 421 | 12.5 |
| Fitih embodiment | 335 | 14.5 |
| Sixth embodiment | 620 | 14.2 |

As the edge portions of the segment and common electrodes are made of zigzag patterns having angles of 45° and 135°, a contrast was able to be larger than a conventional one. A contrast about 1.6 times that of the comparative example was obtained in the fourth embodiment, and a contrast about 2.4 times that of the comparative example was obtained in the sixth embodiment. A corresponding ON transmissivity was also able to be increased. It has been confirmed that it is effective to reduce particularly the number of apexes of the zigzag pattern. It can also be understood that the effect of increasing a contrast can be obtained by forming the zigzag pattern either in the segment electrode or in the common electrode. It can be understood from comparison between the comparative example and the third and fourth embodiments or from comparison between the comparative example and the fifth and sixth embodiments that the effect of increasing a contrast can be obtained more by forming the zigzag pattern preferably both in the segment and common electrodes. It was confirmed that visual recognition of a display pixel constituted of zigzag patterns changes with a visual recognition distance. The shapes of the fifth and sixth embodiments were recognized as a dogleg shape at a visual recognition distance not longer than 10 cm, a visual recognition state was equivalent to that of the second comparative example, and the shape of a pixel was not felt uneasy at a distance longer than 10 cm. The shapes of the third and fourth embodiments were recognized as similar shapes to those of the second comparative example at a distance not longer than 10 cm.

The inventors have studied next slit alignment with an electrode pattern formed with a slit. With slit alignment, it is possible to determine a liquid crystal director direction from an oblique electric field and realize multi-domain having different director directions. This slit alignment is therefore used widely for a vertical alignment liquid crystal display unit having a wide visual angle. Also with the slit alignment using an opening in the display pixel for alignment control of a display pixel, optical through occurs in the presence of applied OFF voltage because of an oblique electric field. To study this phenomenon, simulation was conducted by disposing a zigzag pattern as the pattern edge of a slid portion.

THIRD COMPARATIVE EXAMPLE

Figure 14:
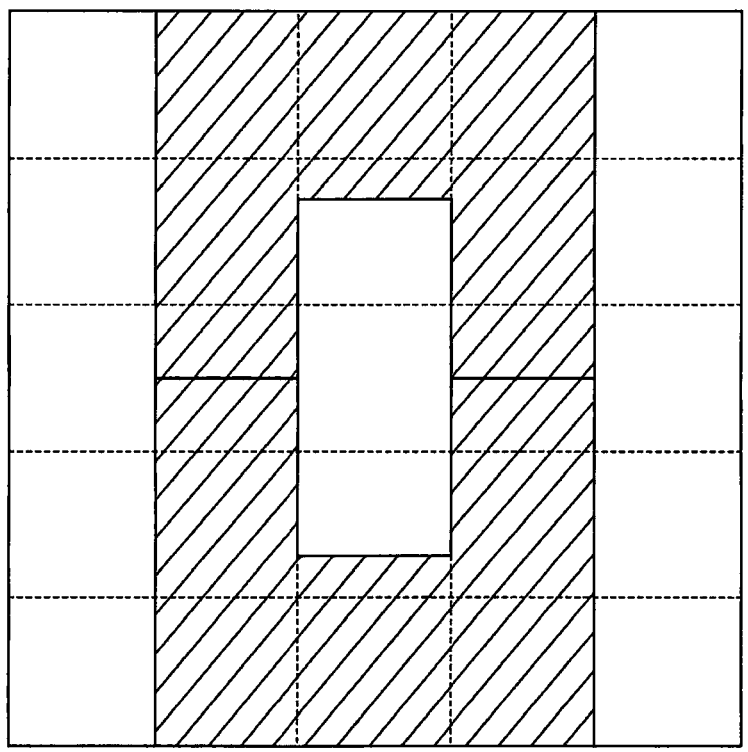
FIG. 14 shows a segment electrode pattern according to a third comparative example.

FIG. 14 shows a segment electrode pattern of the third comparative example. A common electrode has a vertical length of 400 µm and a horizontal length of 500 µm as shown in FIG. 4A. As shown in FIG. 14, a segment electrodes has a vertical length of 500 µm and a horizontal length of 300 µm and has a slit-shaped opening having a vertical length of 250 µm and a horizontal length of 100 µm.

Figure 15:
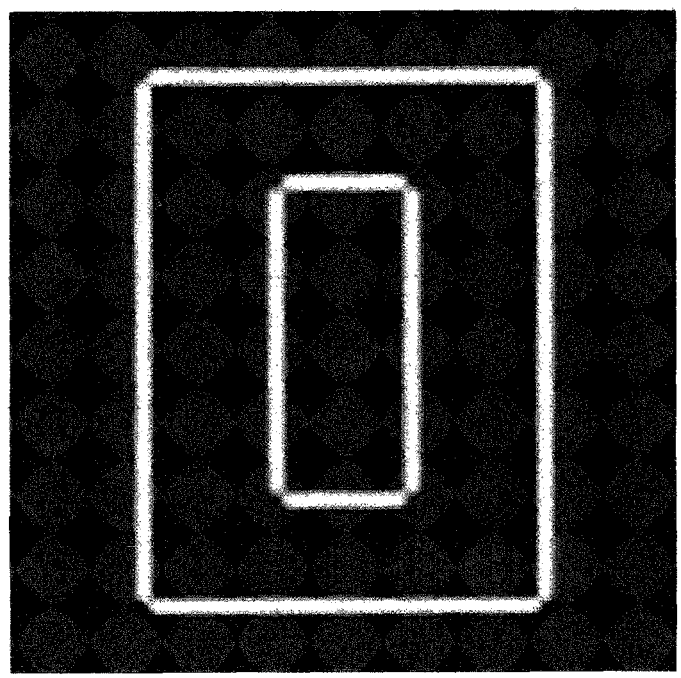
FIG. 15 shows a display state in the presence of applied OFF voltage according to the third comparative example.

FIG. 15 shows a display state of the third comparative example in the presence of applied OFF voltage. As shown, optical through is viewed at the edge peripheral.

(Seventh Embodiment)

Figure 16:
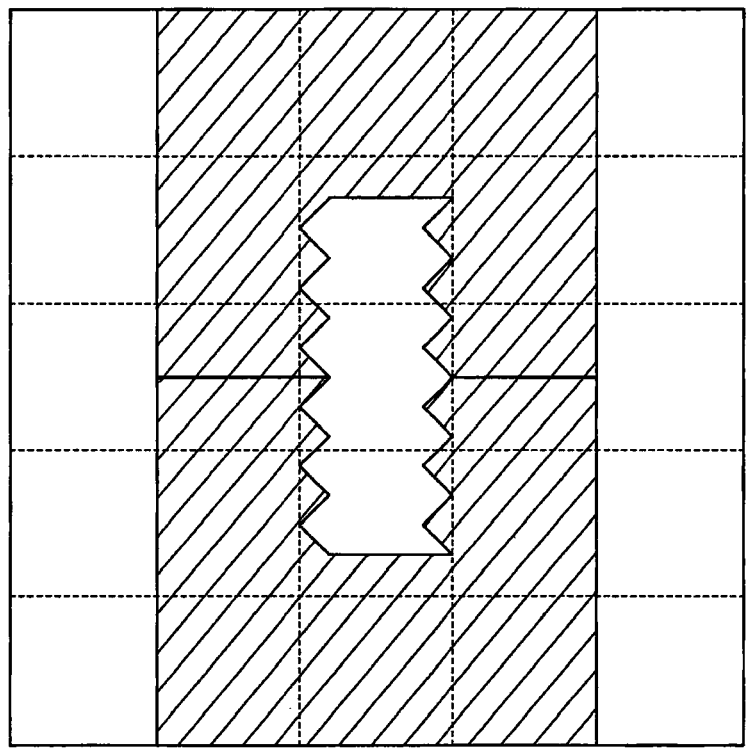
FIG. 16 shows a segment electrode according to a seventh embodiment.

FIG. 16 shows a segment electrode of the seventh embodiment. In the seventh embodiment, a zigzag pattern at angles of 45 and 135° having a pitch of 40 µm was formed for the edge portion of the slit of the third comparative example. A common electrode is similar to that of the third comparative example. Calculations were made under the same conditions as those of the first comparative example and first embodiment excepting that a pretilt angle was set to 90° and an alignment process such as rubbing was not performed.

Figure 17:
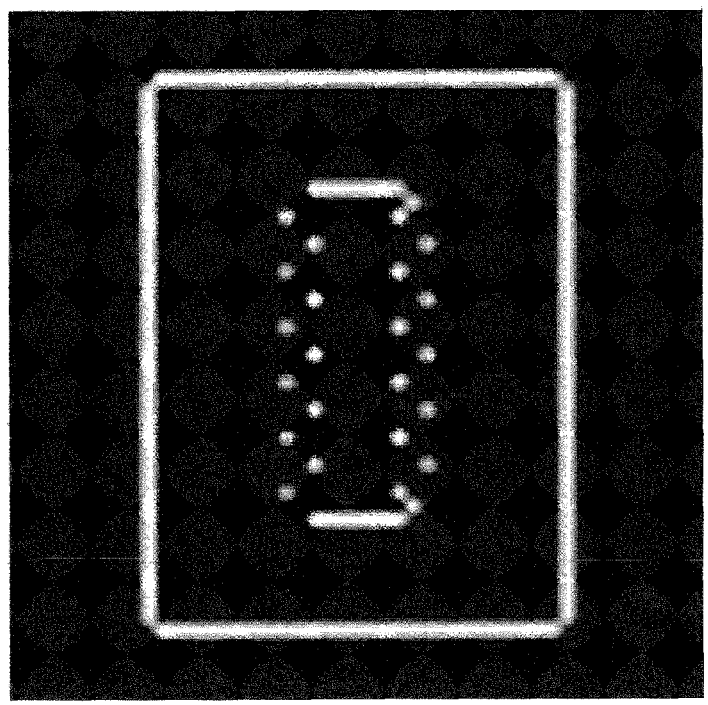
FIG. 17 shows a display state in the presence of applied OFF voltage according to the seventh embodiment.

FIG. 17 shows a display state of the seventh embodiment in the presence of applied OFF voltage. As shown, also in the seventh embodiment, optical through can be prevented by using a slit formed with a zigzag edge pattern having angles of 45° and 135° same as the absorption axis angles of the polarizer plates. It has been confirmed already that the slit having this zigzag pattern does not influence the director orientation during the ON state.

Description will now be made on the eighth and ninth embodiments and a fourth comparative example.

Figure 18:
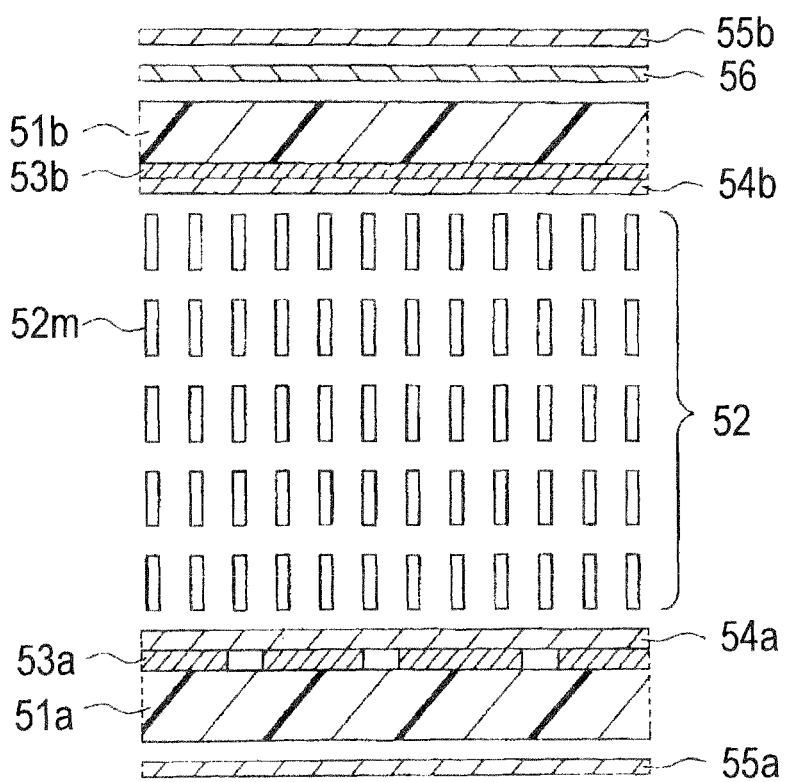
FIG. 18 is a schematic cross sectional view of a liquid crystal display unit.

FIG. 18 is a schematic cross sectional view of a liquid crystal display unit.

The liquid crystal display unit shown has a back substrate 51a made of glass and a front substrate made of glass and facing the back substrate, and a liquid crystal layer 52 is formed between both the substrates 51a and 51b.

Back transparent electrodes 53a serving as segment electrodes are formed on the surface of the back substrate 51a on the liquid crystal layer 52 side, and front transparent electrodes 53b serving as common electrodes are formed on the surface of the front substrate 51b on the liquid crystal layer 52 side.

Both the transparent electrodes 53a and 53b are superposed one upon another with the liquid crystal layer 52 being sandwiched therebetween, and this superposed area forms a display area.

Vertical alignment films 54a and 54b are formed covering the transparent electrodes, on the substrates 51a, 51b on the liquid crystal layer 52 sides, respectively. An insulating film may be formed when necessary between the vertical alignment film and transparent electrode.

A pair of polarizer plates 55a and 55b is formed outside the upper and lower substrates 51a and 51b along the normal direction. The polarizer plates 55a and 55b are disposed to cross their transmission (absorption) axis directions at 90°. If necessary, an optical compensation plate 56 (an A plate, a C plate or a biaxial phase difference plate or the like) may be disposed between the substrate and polarizer plate (e.g., between 51b and 55b).

Description will be made on a manufacture method for the liquid crystal display unit. The transparent electrodes 53a and 53b are formed being made of essentially indium tin oxide ITO on both the substrates 51a and 51b.

The vertical alignment films 54a and 54b are coated and baked, covering the transparent electrodes 53a and 53b, respectively. SE1211 manufactured by Nissan Chemical Industries, Ltd. was used as vertical alignment film material. The vertical alignment film may be a polyimide film, an inorganic film or the like.

A pretilt of 89.5° is given to the vertical alignment films by rubbing or the like. Rubbing is performed to set antiparallel in the 12 o'clock direction and the 6 o'clock direction between the upper and lower substrates. Controlling a tilt direction of liquid crystal molecules may be performed by slit alignment, projection alignment, ultraviolet light alignment or the like.

Next, main seal material is coated on one of the substrates 51a and 51b, gap control material having a predetermined diameter (in this example, 6 μm) is sprayed, thereafter both the substrates 51a and 51b are superposed facing each other on the electrode sides, and the main seal material is cured to thereby form an empty cell.

Liquid crystal is injected into the empty cell to form the liquid crystal layer 52. Liquid crystal material has $\Delta\epsilon = -2.2$ and $\Delta n$ of about 0.20. Liquid crystal molecules 52m in the liquid crystal layer 52 are vertically aligned by the functions of the vertical alignment films.

The optical compensation plate and polarizer plate are bonded to the liquid crystal cell. Four C plates (an in-plane retardation $\Delta R=0$ nm, a thickness direction retardation $\Delta th=220$ nm) are stacked between the lower polarizer plate and liquid crystal cell. SHC-13U manufactured by Polatechno Co. Ltd is used as the polarizer plate. An iodine-containing polarizer plate or a dye-containing polarizer plate may also be used. In this manner, the liquid crystal display unit is completed.

A liquid crystal central molecule alignment direction (liquid crystal director) of a general mono-domain vertical alignment type liquid crystal display unit is set to the 12 o'clock direction or the 6 o'clock direction as viewing the liquid crystal display unit from the front side. With this director setting, display of a wide visual angle can be obtained which has approximately the same right/left visual angle characteristics. In this case, the polarizer plates are cross-Nicol disposed (the axis directions of the two polarizer plates are perpendicular) with the transmission (absorption) axis angles at +45° and −45' relative to the liquid crystal director.

The present inventors manufactured a sample of the liquid crystal display unit having the above-described structure and the following electrode pattern, as a preliminary stage (fourth comparative example).

Figure 19:
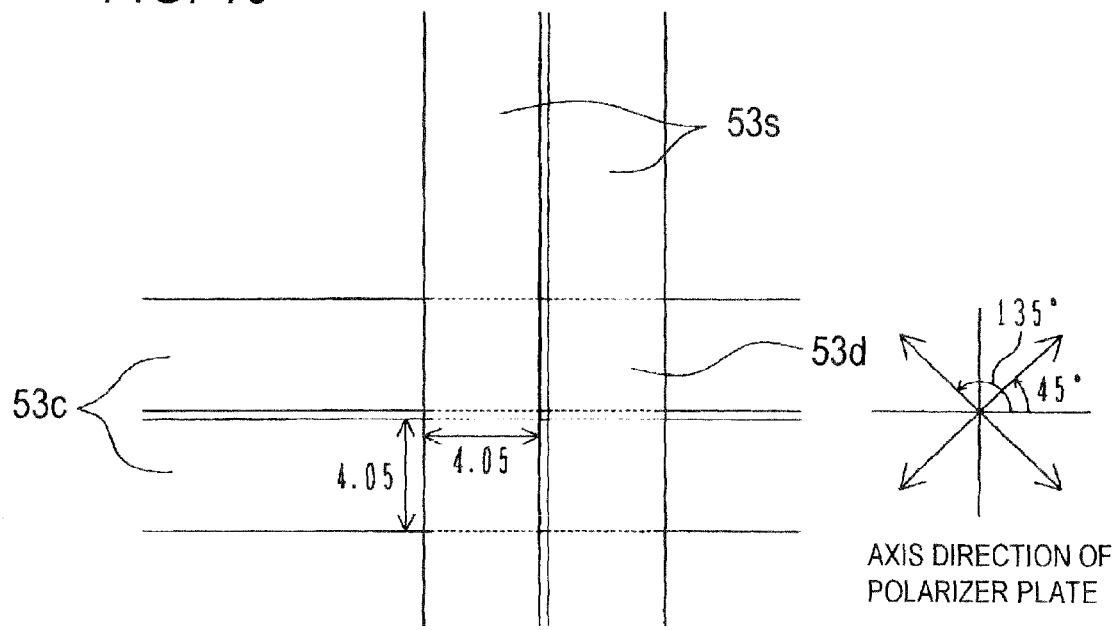
FIG. 19 is a plan view showing a partial area of a pixel of a liquid crystal display unit according to a fourth comparative example.

FIG. 19 is a plan view showing a partial area of a pixel of the liquid crystal display unit of the fourth comparative example. It is herein assumed that an angle increases in the left-hand (counterclockwise) direction by using as 0° the 3 o'clock direction as viewing the front portion of a liquid crystal display unit. In this case, a superposed area of a segment electrode 53s constituted of a 90° stripe and a common electrode 53c constituted of a 0° stripe forms a pixel 53d. As the liquid crystal director is set to 90° (12 o'clock direction), transmission (absorption) axes of two polarizer plates are cross-Nicol disposed at 45° and 135°. The liquid crystal display unit having this polarizer plate layout is a normally black mode.

With this arrangement, as an OFF voltage is applied, an oblique electric field is formed at an edge portion of the pixel 53d in a horizontal direction (0°-180°) between upper and lower (segment and common) electrodes, and liquid crystal molecules fall along an in-plane vertical direction (90° or 270°). An oblique electric field is also formed at an edge portion of the pixel in a vertical direction (90°-270°) between upper and lower (segment and common) electrodes, and liquid crystal molecules fall obliquely in an in-plane horizontal direction (0° or 180°) relative to the substrate surface.

For example, as liquid crystal molecules fall along the 0° direction, a refractive index along the 0°-180° direction in the in-plane becomes higher than that along the 90°-270° direction ill the in-plane. Light polarized at 45' can be divided into 0°-180° components and 90°-270° components which are subjected to different refractive indices to change a polarization state. As the polarization state changes, optical through occurs. As above, it is considered that optical through occurs if polarization components of incident light can be divided into components in the liquid crystal molecule falling in-plane direction and components in an in-plane perpendicular to the first-mentioned in-plane. If a polarization direction is parallel or perpendicular to the liquid crystal molecule falling in-plane direction, such division of optical components will not occur.

The present inventors have paid attention to the relation between the transmission (absorption) axis angle of a polarizer plate and the shape of a dot pattern, so as to prevent optical through from occurring even if liquid crystal molecules fall due to an oblique electric field, and have invented a liquid crystal display unit in which a side of an electrode pattern corresponding to an edge of a display pixel is made parallel or perpendicular to the transmission (absorption) axis angle of the polarizer plate.

Figure 20A:
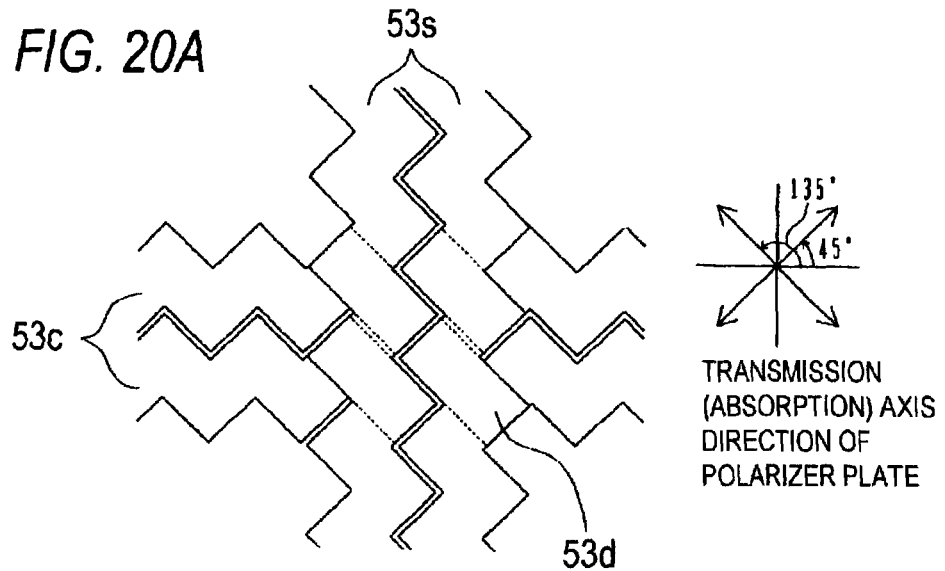
FIG. 20A is a plan view showing a partial area of a pixel of a liquid crystal display unit according to an eighth embodiment.
Figure 20B:
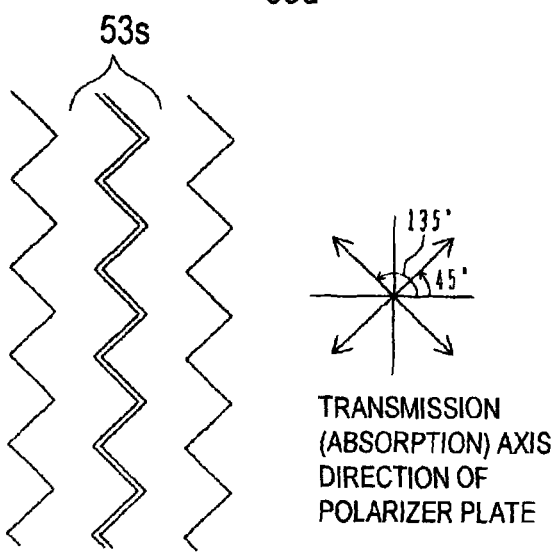
FIG. 20B is a plan view showing a partial area of a segment electrode pattern of the liquid crystal display unit of the eighth embodiment.
Figure 20C:
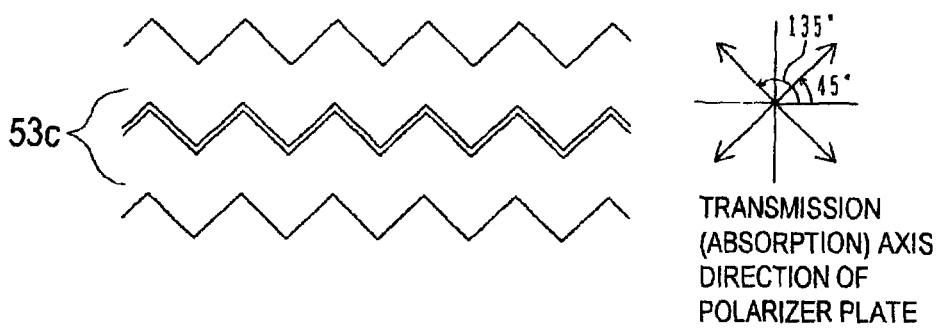
FIG. 20C is a plan view showing a partial area of a common electrode of the liquid crystal display unit of the eighth embodiment.

FIG. 20A is a plan view showing a partial area of a pixel of a liquid crystal display unit of the eighth embodiment. FIG. 20B is a plan view showing a partial area of a segment electrode pattern of the liquid crystal display unit of the eighth embodiment. FIG. 20C is a plan view showing a partial area of a common electrode pattern of the liquid crystal display unit of the eighth embodiment. As shown in FIG. 20B, segment electrodes 53s have a layout that a plurality of zigzag electrode patterns elongated in the vertical direction and having sides at 45° and 135° are juxtaposed along the row direction. As shown in FIG. 20C, common electrodes 53c have a layout that a plurality of zigzag electrode patterns elongated in the horizontal direction and having sides at 450 and 135° are juxtaposed along the column direction. A drive signal is applied to each segment electrode and each common electrode.

As shown in FIG. 20A, a pixel 53d defined by both the superposed electrodes forms a rectangular dot inclined at 45° (in this example, this dot is called an oblique dot). A short side length of one pixel 53d is 286 μm and a long side length is 593 μm. A shortest distance (space) is 30 μm between adjacent segment electrodes 53s and between adjacent common electrodes 53c. A sample of this liquid crystal display unit was manufactured, and a drive voltage was applied to observe display. Optical through was hardly observed at the pixel edge portions.

Figure 21:
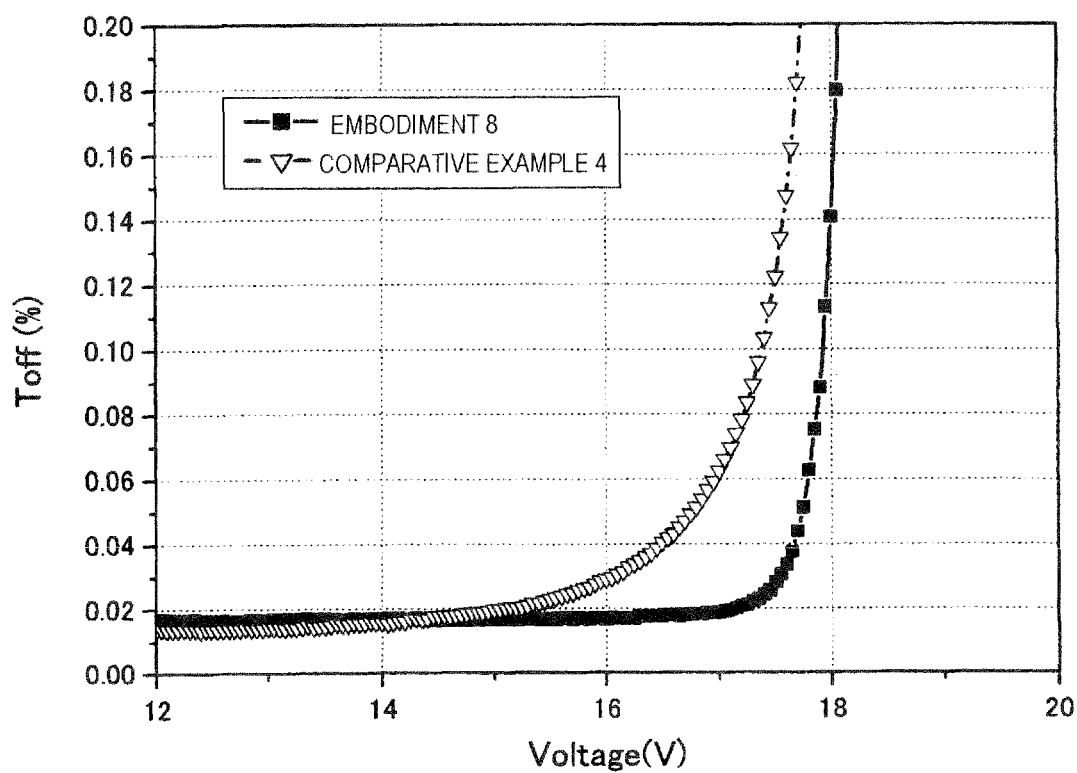
FIG. 21 shows transmissivity/voltage characteristics according to the eighth embodiment and fourth comparative example.

FIG. 21 shows transmissivity/voltage characteristics of the eighth embodiment and fourth comparative example upon application of an OFF waveform. A transmissivity indicated along the ordinate and a voltage indicated along the abscissa were measured with a liquid crystal cell evaluation apparatus LCD-5200 manufactured by Ohtsuka Electronics Co. Ltd. In an area of a transmissivity not smaller than 0.5% upon application of an ON waveform under 1/32 duty driving, the eighth embodiment and fourth comparative example have the same transmissivity/voltage characteristics. In this case, a practically usable transmissivity was obtained at a voltage not lower than 16 V. As shown, the sample of the fourth comparative example started gradually increasing its transmissivity near at 15 V. The sample of the eighth embodiment increased steeply its transmissivity near at 17.5 V. It can be understood that in the eighth embodiment, an OFF transmissivity is low and optical through is suppressed near at a voltage (about 16 V) at which the practically usable ON transmissivity can be obtained.

Figure 22:
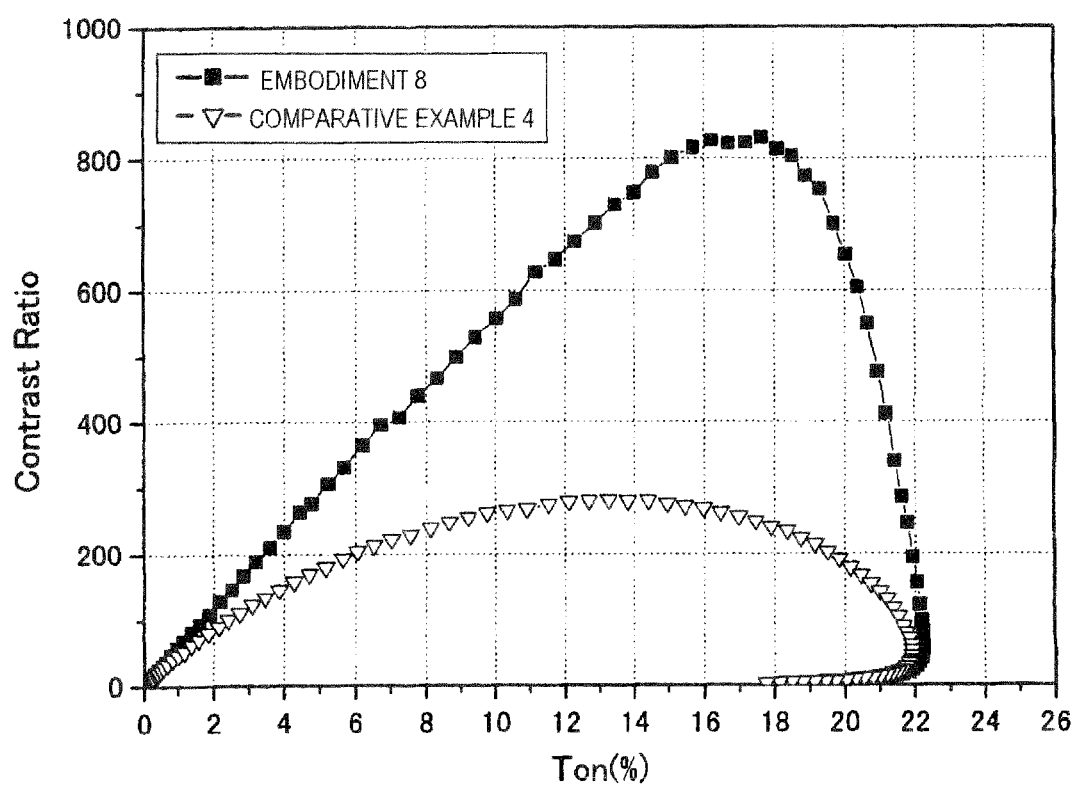
FIG. 22 shows characteristics of a contrast ratio relative to a transmissivity (Ton) in the presence of applied voltage according to the eighth embodiment and fourth comparative example.

FIG. 22 shows the characteristics of a contrast ratio and a transmissivity (Ton) in the presence of applied voltage of the eighth embodiment and fourth comparative example. The contrast ratio is Ton/Toff (in this example, driving at a 1/32 duty and a 1/6 bias). As shown, a contrast ratio of the eighth embodiment was large and the highest contrast ratio was not smaller than 800. A transmissivity at the highest contrast ratio was 13% in the fourth comparative example, and 18% in the eighth embodiment. As a high contrast ratio can be realized at a higher transmissivity, there is a merit that display of the liquid crystal display unit becomes bright.

It can be considered from the results shown in FIGS. 21 and 22 that a high contrast ratio of the sample of the eighth embodiment was realized by maintaining a low transmissivity in the presence of applied OFF waveform up to the higher voltage region than that of the fourth comparative example. It can be said that maintaining the low transmissivity in the presence of applied OFF waveform corroborate reduction in optical through at the pixel edge portions in the presence of applied OFF waveform.

Figure 23:
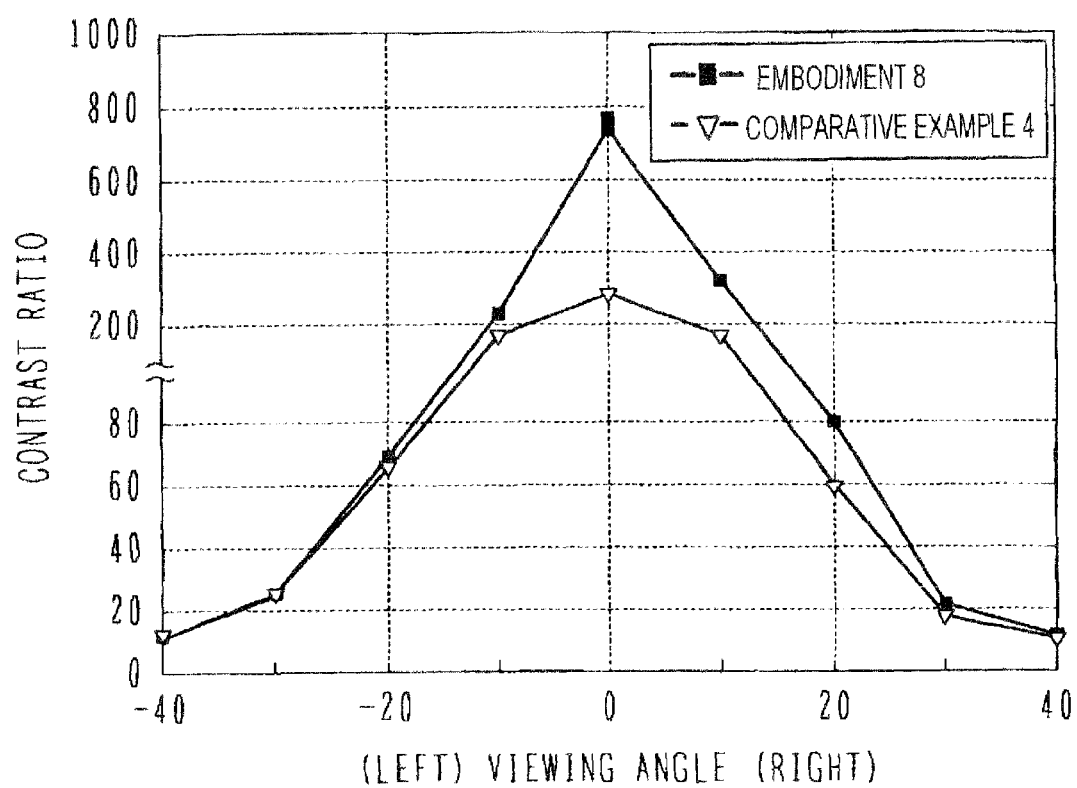
FIG. 23 is a graph showing a visual angle dependency of a contrast ratio at a front transmissivity of 13% (a transmissivity at which a maximum contrast ratio was obtained in the fourth comparative example).

FIG. 23 is a graph showing a visual angle (viewing angle) dependency of a contrast ratio at a front transmissivity of 13% (at which the highest contrast ratio of the fourth comparative example is obtained). In order to set the same front transmissivity, different applied voltages were used for the eighth embodiment and fourth comparative example. As shown, a contrast ratio of the eighth embodiment in the visual angle range of about right/left 20 degrees is higher than that of the fourth comparative example. It can therefore be said that the liquid crystal display unit of the eighth embodiment has also good visual angle characteristics. About ten persons observed to check whether display by the oblique dot of the eighth embodiment indicated some feeling of strangeness. There was no particular feeling of strangeness. A distance between pixel center lines not posing a visual recognition problem was not longer than about 400 μm.

As in the eighth embodiment, by making the transmission (absorption) axis angle of the polarizer plate parallel or perpendicular to the sides of the electrode pattern, optical through can be reduced and a high contrast can be realized.

Figure 24A:
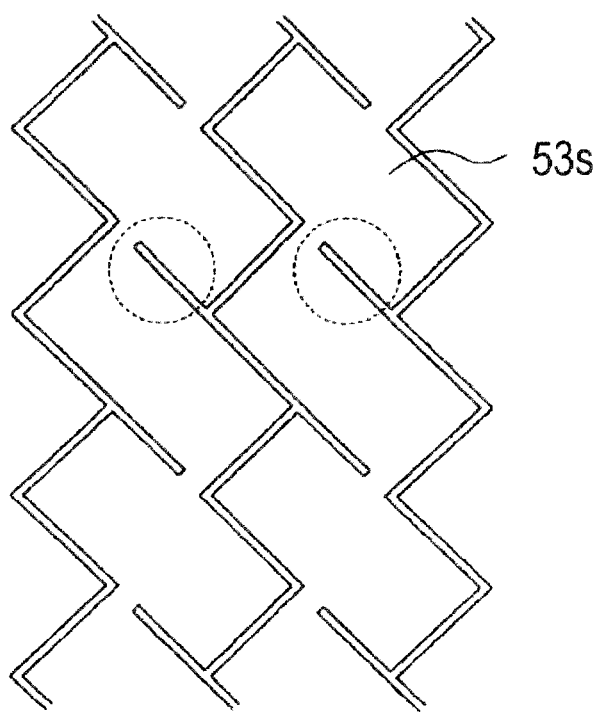
FIG. 24A shows a segment electrode pattern according to a ninth embodiment.
Figure 24B:
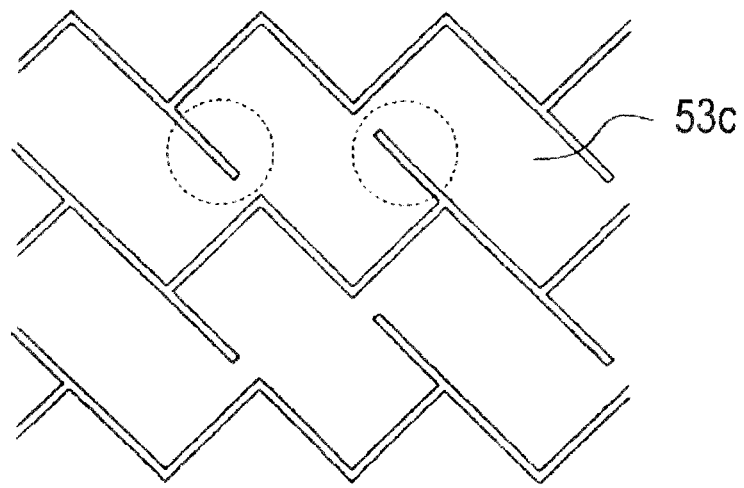
FIG. 24B shows a common electrode pattern of the ninth embodiment.

FIG. 24A shows a segment electrode pattern of the ninth embodiment, and FIG. 24B shows a common electrode pattern of the ninth embodiment. In order to realize a wider visual angle, the present inventors have tried to form segment and common electrodes by forming a cut line (in FIGS. 24A and 24B, areas surrounded by doted circles) in an area corresponding to the side of an oblique dot as many as possible. There is a displacement at a deep visual angle between the transmission (absorption) axis angle of a polarizer plate and the liquid crystal direction to be caused by an oblique electric field generated near at the side of each oblique dot. The cut line is formed to suppress optical through to be caused by this displacement.

Figure 25:
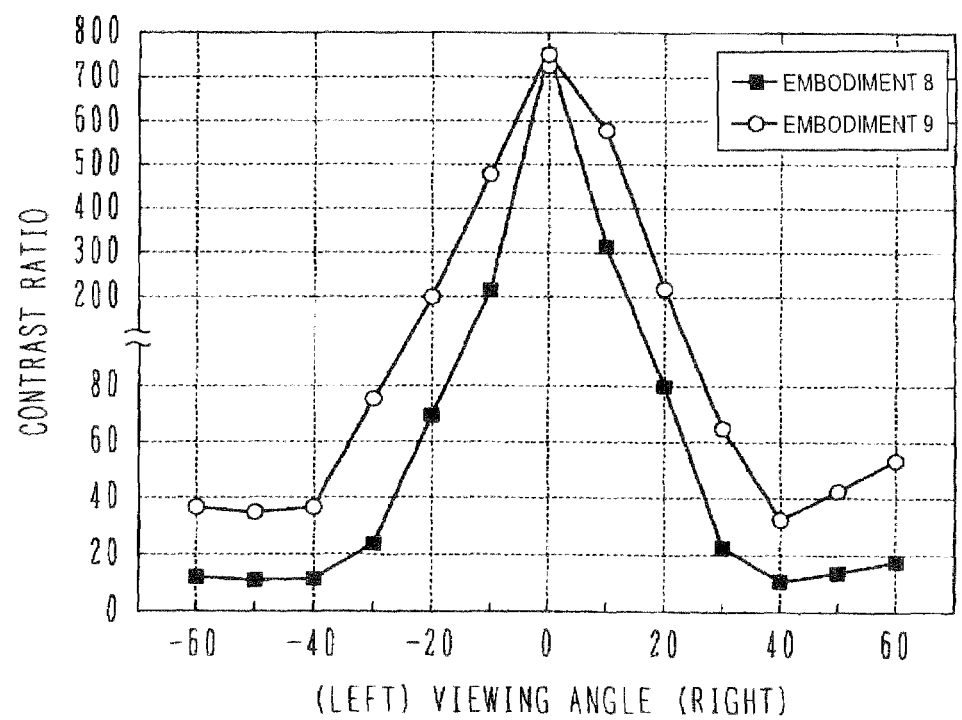
FIG. 25 is a graph showing a visual angle dependency of a contrast ratio according to the eighth and ninth embodiments.

FIG. 25 is a graph showing the visual angle dependency of a contrast ratio of the liquid crystal display units of the eight and ninth embodiments. As shown, the ninth embodiment had a higher contrast ratio to about right/left 60° than that of the eighth embodiment, and was able to obtain a wider visual angle. This may be ascribed to that the oblique electric field was able to be reduced by forming the cut line in both the segment and common electrodes in the area corresponding to the side of an oblique dot.

A depth of the cut line may be set arbitrary. The depth is however desired not to increase a resistance of the electrode. A target depth is considered to be preferable if about 1/5 the side of an oblique dot is left. A length (width) of the cut line in the short side direction is preferably not shorter than about 10 μm.

Figure 26A:
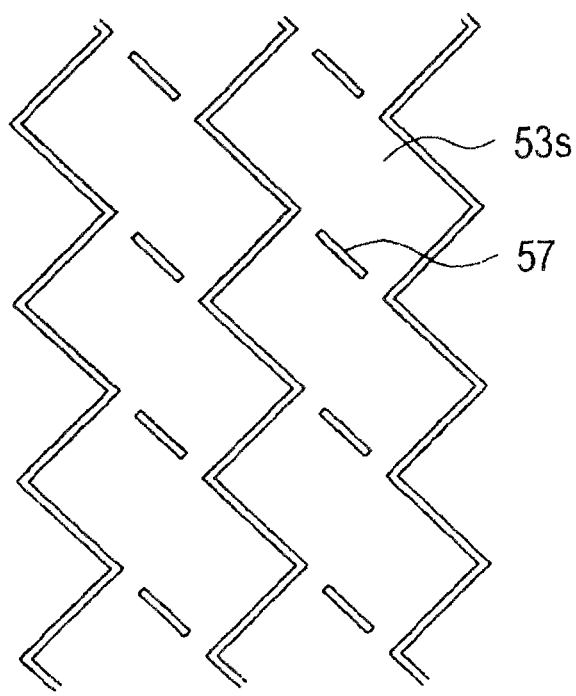
FIGS. 26A and 26B show a segment electrode pattern and a common electrode pattern according to a modification of the ninth embodiment.
Figure 26B:
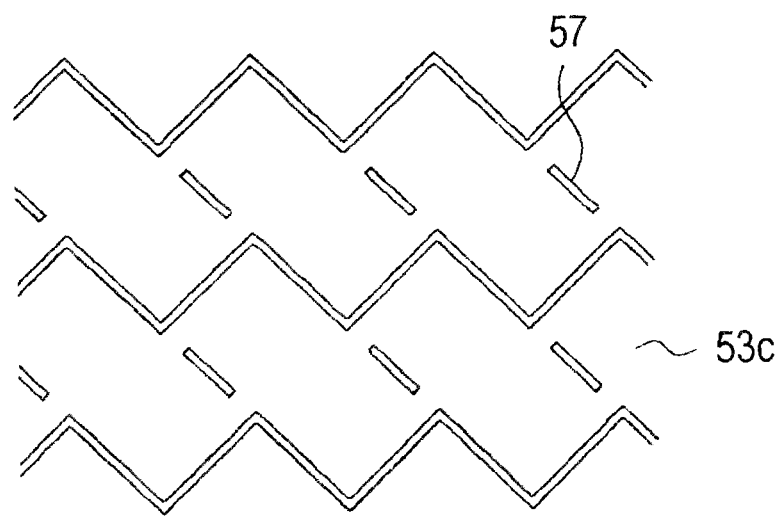

FIGS. 26A and 26B show a segment electrode pattern and a common electrode pattern according to a modification of the ninth embodiment. As shown in FIGS. 26A and 26B, a cut line of the electrode pattern may be a slit 57 separated from the electrode edge.

The present invention has been described in connection with the embodiments. The present invention is not limited to the above-described embodiments.

Figure 27:
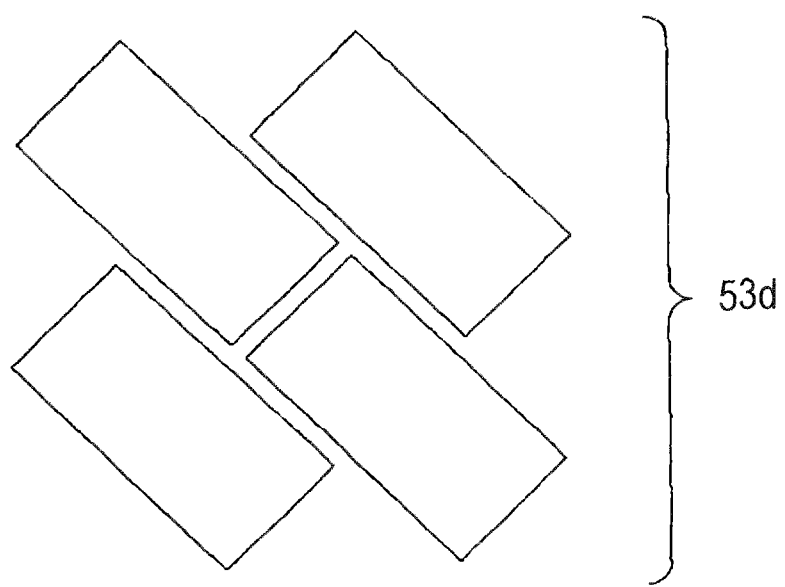
FIG. 27 is a plan view showing a partial area of a pixel of a liquid crystal display unit.

FIG. 27 is a plan view showing a partial area of a pixel of a liquid crystal display unit. As shown, one dot may be constituted of a combination of a plurality of oblique dots.

Although the polarizer plate transmission (absorption) axis angles are desired to be crossed at 90°, there is no problem even if each angle shifts by a few degrees.

In the above-embodiments, although the mono-domain liquid crystal display unit has been described, the embodiments are expected to be applied also to a multi-domain liquid crystal display unit, if a polarization direction is +45° or −45° relative to the liquid crystal molecule falling direction (liquid crystal director) in the pixel in-plane.

Next, tenth and eleventh embodiments and fifth and sixth comparative examples will be described.

Figure 28:
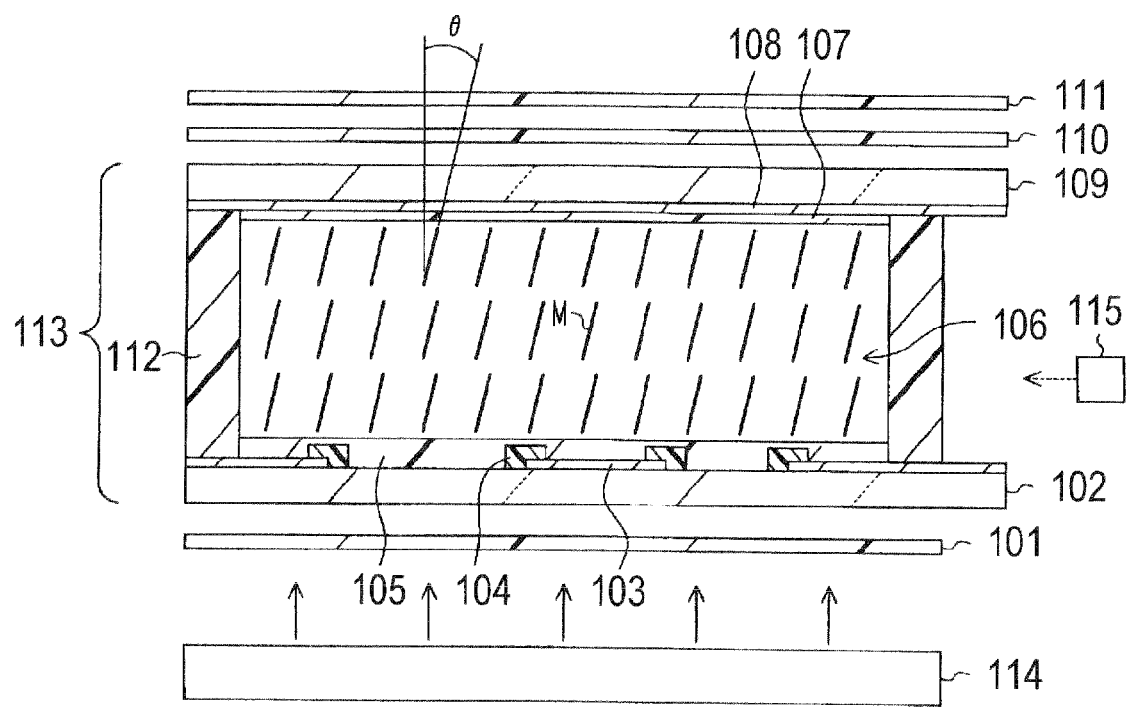
FIG. 28 is a schematic cross sectional view of a liquid crystal display unit according to a tenth embodiment of the present invention.

First, description will be made on a liquid crystal display unit according to the tenth embodiment of the present invention. FIG. 28 is a schematic cross sectional view of the liquid crystal display unit of the tenth embodiment. Segment electrodes 103 and black masks 104 are formed on a lower transparent substrate 102, and a lower alignment film 105 is formed covering the segment electrodes 103 and black masks 104.

Common electrodes 108 are formed on an upper transparent substrate 109, and an upper alignment film 107 is formed covering the common electrodes. For example vertical alignment films SE-1211 manufactured by Nissan Chemical Industries, Ltd. are used as the upper and lower alignment films 107 and 105.

Figure 29:
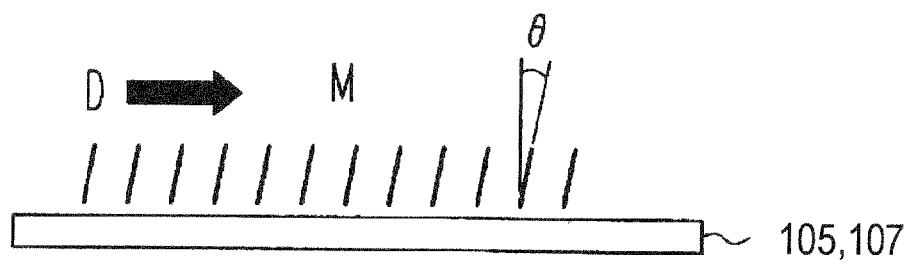
FIG. 29 is a schematic cross sectional view showing a relation between a rubbing direction and a pretilt angle.

The upper and lower alignment films 107 and 105 are rubbed with rubbing cloth made of rayon so that a pretilt angle θ is given to crystal molecules M so as to fall along a rubbing direction D as shown in FIG. 29. The pretilt angle θ is defined as an inclination from a normal direction of the transparent substrate under the alignment film.

The upper transparent substrate 109 and lower transparent substrate 102 whose alignment films were subjected to rubbing are superposed each other with gap control members having a diameter of 4 μm being interposed therebetween and with the alignment films facing each other and having antiparallel rubbing directions, and the superposed structural body is sealed with sealing material 112 to thereby form an empty cell.

Liquid crystal is injected into the empty cell to form a liquid crystal layer 106 and a crystal cell 113. The liquid crystal material has a birefringence Δn of 0.09 and negative dielectric constant anisotropy. For example, liquid crystal material manufactured by Merck Ltd., Japan may be used. Since the dielectric constant anisotropy is negative the liquid crystal molecules M fall from the vertical alignment upon voltage application.

A lower polarizer plate 101 and an upper polarizer plate 111 are disposed under and above the liquid crystal cell 113, respectively. The lower polarizer plate 101 and upper polarizer plate 111 are cross-Nicol disposed. The liquid crystal display unit of the embodiment is a vertical alignment type liquid crystal display unit for normally black display. A backlight 114 is disposed under the lower polarizer plate 101, and radiates light to the lower polarizer plate 101. Bright display is called white display, and dark display is called black display.

A biaxial plate 110 as a visual angle compensation plate is inserted between the liquid crystal cell 113 and upper polarizer plate 111. The biaxial plate 110 has an in-plane retardation of 50 nm and a retardation of 220 nm in a thickness direction (in a cross section along a thickness direction). The biaxial plate 110 is disposed in such a manner that its in-plane delay phase axis becomes perpendicular to an absorption axis of the upper polarizer plate 111 as the adjacent polarizer plate. The visual angle compensation plate may be disposed between the liquid crystal cell 113 and lower polarizer plate 101.

The segment electrodes 103 and common electrodes 108 are made of transparent conductive material such as indium tin oxide (ITO). Superposed areas between the segment electrodes 103 and common electrodes 108 in a display screen define a display pattern. In accordance with the shape of a desired display pattern, the segment electrodes 103 and common electrodes 108 are formed having respective plan shapes. In the example shown in FIG. 28, the common electrodes 108 are inclusive of the segment electrodes 103 in the display screen, and the edges of the segment electrodes 103 define the edge of the display pattern. A controller 115 drives the liquid crystal display unit in a single matrix way.

The black masks 104 are formed covering the edges of the display pattern (in the example shown in FIG. 28, covering the edges of the segment electrodes 103) in the display screen. For example, the black mask 104 is made of resin or metal having transparency (e.g., a transmissivity not larger than 2%), and shields light from the backlight 114. It is preferable that the upper surface of the black mask 104 does not reflect external light incident from the upper side of the liquid crystal display unit.

Figure 30A:
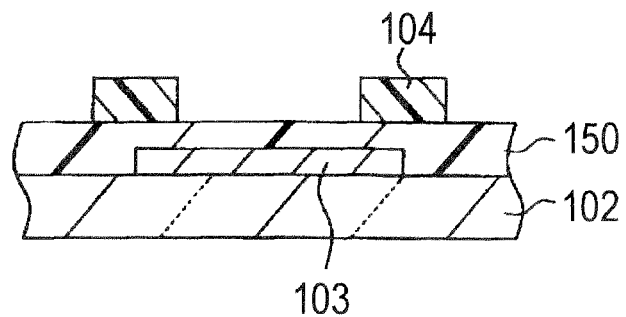
FIGS. 30A to 30C are cross sectional views showing various examples of a black mask disposing method.

As shown in FIG. 30A, if the black mask 104 is made of conductive material, an insulating layer 150 is formed between the segment electrode 103 and black mask 104.

Figure 30B:
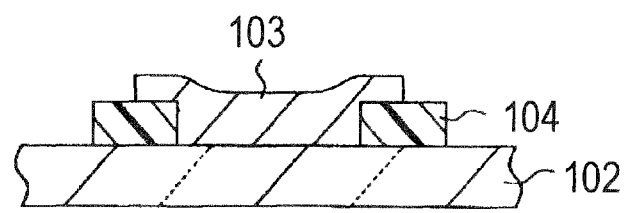

As shown in FIG. 30B, the black mask 104 may be formed on the substrate 102, covering the edge of the display pattern, and the segment electrode 103 is formed on the substrate 102, partially riding on the black mask 104. A planarizing film having a height (thickness) flush with the black mask 104 may be formed between the black masks 104, and the segment electrode 103 is formed on the layer constituted of the black mask 104 and planarizing film to thereby improve flatness.

Figure 30C:
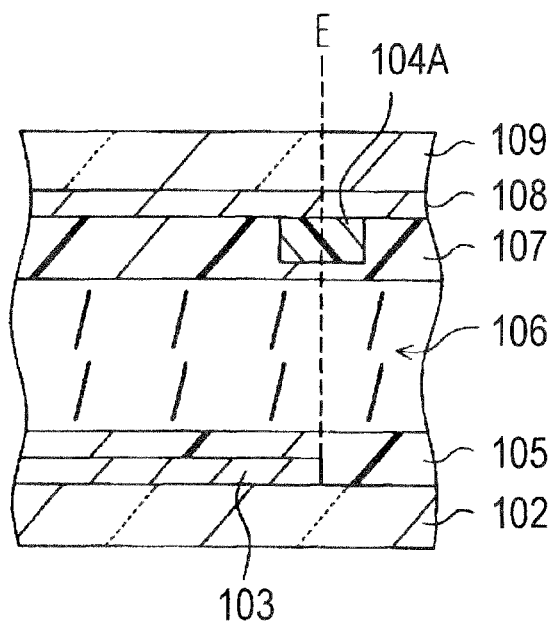

As shown in FIG. 30C, the black mask 104 may be disposed not on the segment electrode 103 side but on the common electrode side 108, to cover the edge of the display pattern. In the example shown in FIG. 30C, a black mask 104A is disposed on the common electrode 108, covering the edge E of the display pattern defined by the edge of the segment electrode in the display screen.

In these examples, although the edge of the display pattern is defined by the edge of the segment electrode 103, the edge of the common electrode 108 defines the edge of the display pattern or the edges of the segment electrode 103 and common electrode 108 define the edge of the display pattern if the edges of both the electrodes are coincident, depending upon designs of electrode patterns.

When necessary, a black mask may be formed on the segment electrode 103 side for a portion of the edge of the display pattern, and on the common electrode 108 side for the other portion of the edge of the display pattern.

In the above examples, although the segment electrodes are formed on the lower substrate side and the common electrodes are formed on the upper substrate side, the segments electrodes may be formed on the upper substrate side and the common electrodes are be formed on the lower substrate side, when necessary.

A thickness of the black mask is not specifically limited. However, if the black mask is made very thick, e.g., not thinner than 3 μm, forming an edge of a taper shape, forming a planarizing layer covering the surface of the black mask or the like may be preferable in order to suppress orientation disturbance of liquid crystal to be caused by the edge of the black mask.

Figure 31:
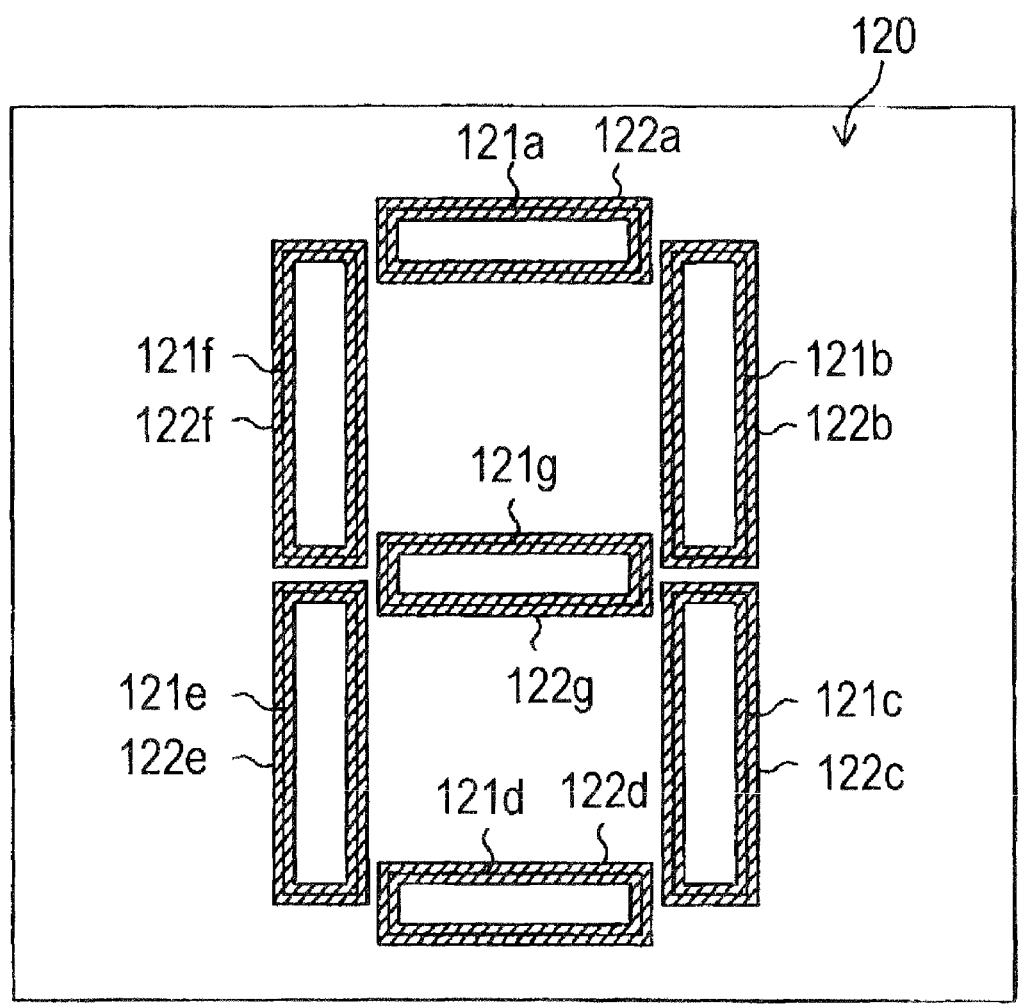
FIG. 31 is a schematic plan view showing a black mask layout of the liquid crystal display unit of the tenth embodiment.

With reference to FIG. 31, description will further be made on a layout of the black masks 104. FIG. 31 is a schematic plan view showing an example of a display screen of a liquid crystal display unit. FIG. 31 shows a 7-segment display portion of one digit in the display screen 120. The 7-segment display portion is constituted of seven segment display patterns 121a to 121g. The segment display patterns 121a to 121g have stripe black masks 122a to 122g covering the edges of the segment display patterns and formed along the edges. The black masks 122a to 122g are shown by hatched lines. In this examples a width of each of the black masks 122a to 122g is 20 μm.

For example, the black mask 122a is formed being superposed upon the area from the edge of the segment display pattern 121a to the inner area thereof by 10 μm in the width direction and to the outer area thereof by 10 μm. Similarly, the other black masks 122b to 122g are formed being superposed upon the areas from the edges of the segment display patterns 121b to 121g to the inner and outer areas thereof by 10 μm.

Figure 32:
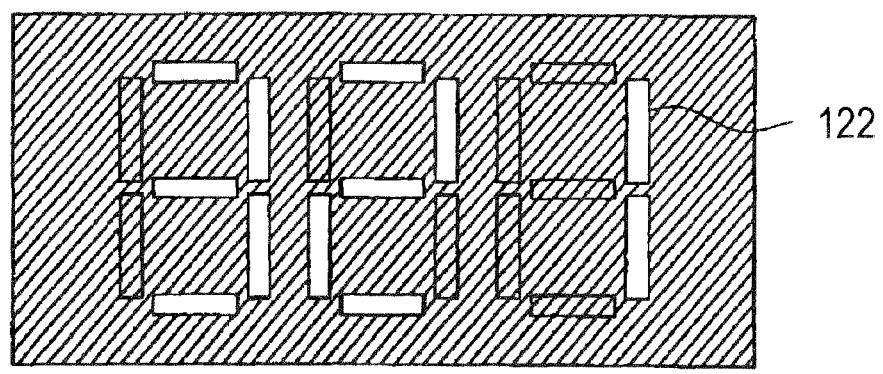
FIG. 32 is a schematic plan view showing a display state of the liquid crystal display unit of the tenth embodiment.
Figure 35:
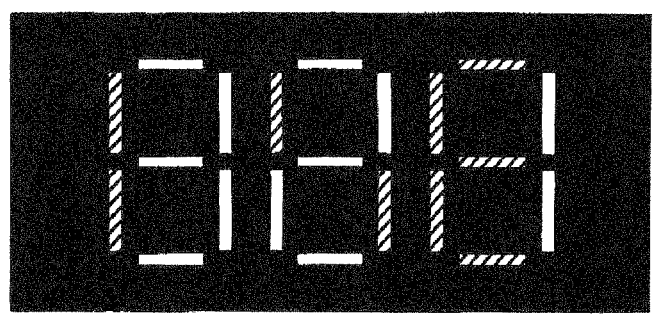
FIG. 35 is a schematic plan view showing a display state of the liquid crystal display unit of the fifth comparative example.

FIG. 32 is a schematic plan view showing a display state of 7-segment display portions of three digits each having the black masks described above. An example of the display state described with reference to FIG. 35 in the paragraph "DESCRIPTION OF THE RELATED ART" is called the fifth comparative example. Similar to the fifth comparative example, the display state of this embodiment shows white display of "321" by the 7-segment display portions of three digits, under black background.

In this embodiment, the black mask 122 is formed only near the edges of each segment display pattern, and is not formed in the background but the liquid crystal layer is exposed. A transmissivity of the black background (indicated by hatched lines) is a transmissivity of not the black mask but the liquid crystal layer.

Therefore, a transmissivity of each segment (indicated by hatched lines) of black display is nearly equal to that of the background. With this arrangement, a phenomenon that a black display segment is displayed dim can be suppressed more than the fifth comparative example having the black mask formed in the whole background. Namely, crosstalk to be caused by the black mask can be suppressed.

In order to eliminate crosstalk to be caused by the black mask, a method may be considered by which a black mask having a transmissivity similar to that of a black display segment display pattern is formed in the whole background. However, a transmissivity of the display pattern changes with a visual angle change, so that it is difficult to suppress a transmissivity difference between the display pattern and background in the wide visual angle range.

In this embodiment, the black mask is formed only near the edges of each segment display pattern, and the background exposes the liquid crystal layer similar to the display pattern. Therefore, as compared to the case wherein the black mask is formed in the whole background, the transmissivities of the display pattern and background change similarly even if a visual angle changes. The transmissivity difference between the display pattern and background can therefore be suppressed in the wide visual angle range.

Generally, a black display portion of a vertical alignment type liquid crystal display unit can maintain a low transmissivity in a wide visual angle range. Therefore, the liquid crystal display unit of the embodiment can suppress a transmissivity difference between the black display pattern and background while maintaining low transmissivities of the black display pattern and background in the wide visual angle range.

Also, in the liquid crystal display unit of the embodiment, optical through near the edges can be suppressed by the black masks formed near the edges of the segment display pattern.

Consider a liquid crystal display unit of a sixth comparative example omitting the black masks from the liquid crystal display unit of the tenth embodiment. Description will be made on optical through near the edges in the liquid crystal display unit of the sixth comparative example. A display pattern of black display under simple matrix driving of a liquid crystal display unit of normally black display is formed by an applied off-voltage lower than an on-voltage for white display.

Figure 33A:
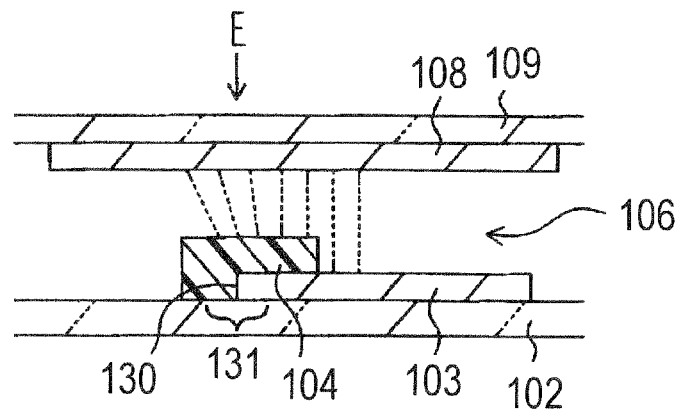
FIGS. 33A to 33C are schematic cross sectional views of a liquid crystal display unit according to the tenth embodiment, an eleventh embodiment and a sixth comparative example, showing directions of an electric field in the presence of applied OFF voltage.
Figure 33B:
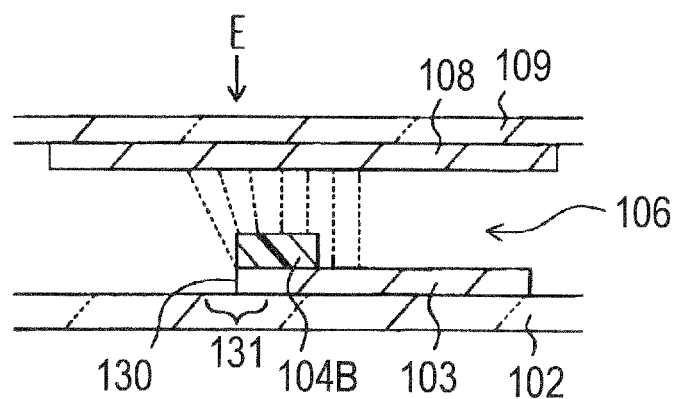
Figure 33C:
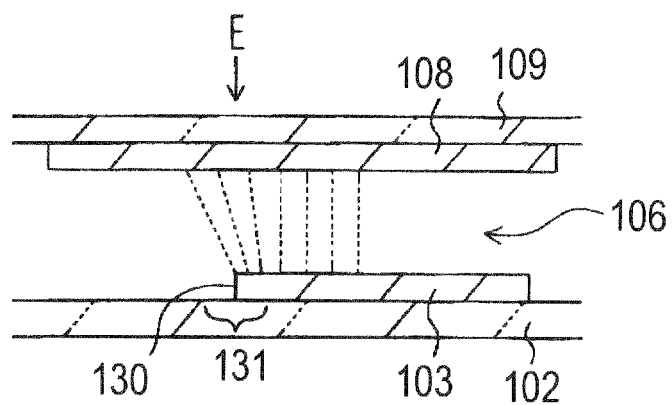

FIG. 33C is a schematic cross sectional view of a liquid crystal display unit of the sixth comparative example, showing directions of an electric field. Broken lines indicate directions of an electric field across a segment electrode 103 and a common electrode 108. The common electrode 108 is so broad that it is inclusive of the segment electrode 103 in the display screen, and the edges of the segment and common electrodes are not coincident. An edge 130 of the segment electrode 103 defines an edge L of the display pattern.

In the display screen sufficiently inner than the edge 130 of the segment electrode 103, the electric field is parallel to the normal of the substrate (upper substrate 109 or lower substrate 102). However, in the area near the edge 130, an oblique electric field slanted from the substrate normal is generated.

In the presence of applied off-voltage, although liquid crystal molecules do not move maintaining the initial vertical alignment, in the area where the electric field is parallel to the substrate normal direction, liquid crystal molecules move under the influence of the oblique electric field, in the area 131 near the edge 130. Optical through occurs therefore in the area 131 near the edge 130.

Figure 34A:
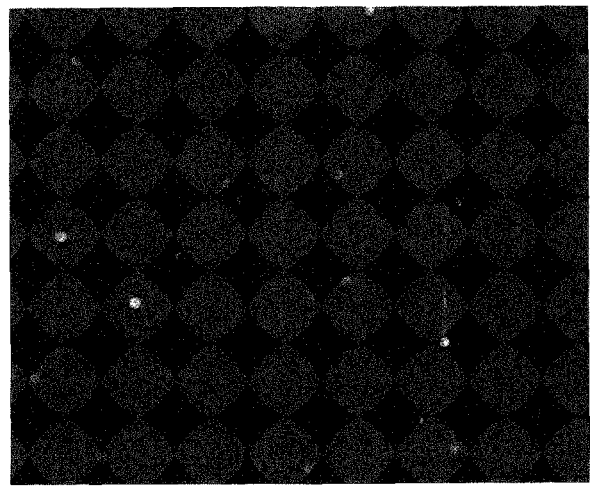
FIGS. 34A to 34C are photographs of the liquid crystal display units in black display according to the tenth embodiment, eleventh embodiment and sixth comparative example.
Figure 34B:
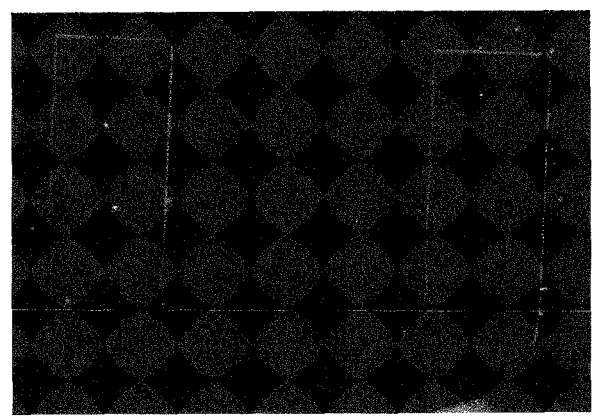
Figure 34C:
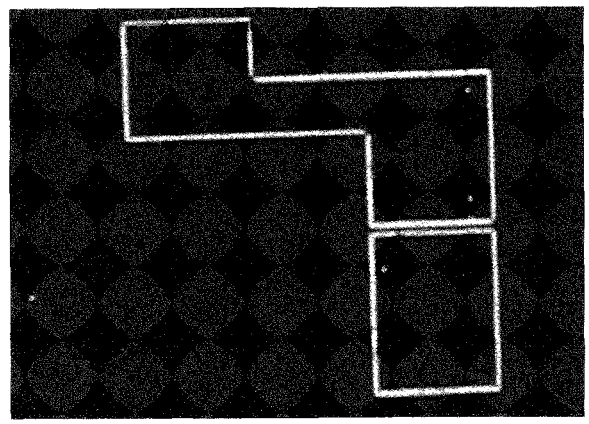

FIG. 34C is a photograph of black display of the liquid crystal display unit of the sixth embodiment not forming the black mask. Optical through occurs along the edges of a display pattern.

FIG. 33A is a schematic cross sectional view of a liquid crystal display unit of the tenth embodiment, showing directions of an electric field in the presence of applied off-voltage. Similar to the sixth comparative example an oblique electric field is generated near an edge 130 of a segment electrode 103. However, in the tenth embodiment, a black mask 104 is formed covering the area 131 near the edge 130 where optical through could occur, in the display screen. Light which may cause optical through if the black mask 104 is not formed, is shielded by the black mask 104.

FIG. 34A is a photograph of black display of the liquid crystal display unit of the tenth embodiment having the stripe black mask covering the edge of the display pattern and formed along the edge. A width of the black mask is 20 μm. The black mask is superposed upon the display pattern in the area from the edge of the display pattern to the inner and outer areas thereof by 10 μm. Optical through near the edge of the display pattern is hardly observed.

Next, description will be made on a liquid crystal display unit of the eleventh embodiment. In the tenth embodiment, the black mask is formed being superposed from the edge of the display pattern to both the inner and outer areas thereof. In the eleventh embodiment, a black mask is formed being superposed upon the display pattern along the edge of the display pattern only in the inner area thereof.

FIG. 33B is a schematic cross sectional view of a liquid crystal display unit of the eleventh embodiment showing directions of an electric field in the presence of applied off-voltage, and FIG. 33C shows a photograph of black display. As shown in FIG. 33B, in the eleventh embodiment, a black mask 104B is formed in an area inner than the edge 130 of a display pattern by using the edge 130 as an origin. The edge E of the display pattern and the edge of the black mask 104B are superposed in the display screen (the edge E of the display pattern and the black mask 104B contact in the display screen).

In the example of the photograph shown in FIG. 34B, a black mask width is set to 10 μm. As compared to the tenth embodiment forming the black mask in both the inner and outer areas of the display pattern, optical through can be observed to some degree. However, as compared to the sixth comparative example not forming the black mask, optical through can be improved considerably.

On the assumption that optical through occurs only in the area of the display pattern inner than the edge, optical through could hardly be observed also in the example of the photograph of the eleventh embodiment shown in FIG. 34B, similar to the example of the tenth embodiment shown in FIG. 34A. Also on the assumption that optical through occurs only in the area of the display pattern outer than the edge, all optical through occurrences could be observed also in the example of the photograph of the eleventh embodiment shown in FIG. 34B, similar to the example of the photograph of the sixth comparative example shown in FIG. 34C.

From the results that optical through increases in the example of the photograph of the eleventh embodiment shown in FIG. 34B more than the example of the photograph of the tenth embodiment shown in FIG. 34A and that the optical through is improved more than the example of the photograph of the sixth comparative example shown in FIG. 34C, it can be considered that optical through occurs in both the areas inner and outer than the edge of the display pattern.

It can be understood from the above observations that optical through near the edge can be shielded effectively even if the black mask is formed in one of the areas inner and outer than the edge of the display pattern. If the black mask is formed in both the areas inner and outer than the edge of the display patter, optical through can be shielded more effectively.

If a width of the black mask superposed upon the area inner or outer than the edge of the display pattern is set to 5 µm, although the shielding effects by a width of 10 µm were not able to be obtained, optical through was able to be suppressed definitely as compared to no black mask. It is therefore preferable to set 5 µm or wider as a width of the black mask superposed upon the area inner or outer than the edge of the display pattern. Even if a width of the black mask superposed upon the area inner or outer than the edge of the display pattern is set wider than 10 µm, the shielding effects were the same degree as that of a width of 10 µm.

It is not preferable to set the black mask width too wide, because the black mask itself is visually recognized. Various widths have been studied, and it has confirmed that the total width of the black mask in the display screen is preferably not wider than 50 µm.

As described so far, by using a stripe light shielding film along the edge of a display pattern, it is possible to suppress the phenomenon that visual states show different transmissivities of a display pattern of black display and a background of black display, more than, for example, the case wherein the light shielding film is formed in the whole background.

Furthermore, by using a stripe light shielding film along the edge of a display pattern, it is possible to shield optical through to be formed near at the edge of the display pattern in black display. If the width of the light shielding film is made sufficiently narrow (e.g. about 20 µm), the light shielding film itself can be made not visually recognizable.

Although the embodiments have been described by using the vertical alignment type liquid crystal display unit by way of example, liquid crystal display units of other types may also be used such as a horizontal alignment type liquid crystal display units of TN, STN and the like. The techniques of the embodiments are effective for liquid crystal display units which apply a voltage to a display pattern during black display, such as normally black display under simple matrix driving.

Namely, by using a stripe light shielding film along the edge of a display pattern in place of a light shielding film formed in the whole background, it becomes possible to reduce a transmissivity difference between the background and black display pattern. Further, by using a stripe light shielding film along the edge of a display pattern, it becomes possible to shield optical through near the edge of a black display pattern. Also in TN, STN and the like, optical through may occur to be caused by orientation disturbance near the edge due to an oblique electric field.

Although the present invention has been described in connection with the embodiments, the present invention is not limited to these embodiments. For example, it is obvious for those skilled in the art that various modifications, improvements, combinations and the like are possible.

What is claimed is:

1. A liquid crystal display unit comprising:
    a first substrate and a second substrate opposing each other;
    a first electrode pattern formed on said first substrate;
    a second electrode pattern formed on said second substrate;
    a vertical alignment film formed on at least one of said first and second substrates and covering at least one of said first and second electrode patterns;
    a liquid crystal layer sandwiched between said first and second substrates; and
    a pair of polarizer plates disposed outside said first and second substrates and having crossed-Nicols;
    wherein:
    an edge of at least one of said first and second electrode patterns includes a sawtooth pattern comprising a plurality of serially connected teeth with edges of the teeth being parallel and perpendicular to one of said crossed-Nicols;
    one of said first and second electrode patterns includes a segment electrode;
    the other of said first and second electrode patterns includes a common electrode;
    an overlapping area of said segment electrode and said common electrode defines a pixel; and
    said pixel is defined by a first pair of parallel sides and a second pair of parallel sides, and each of said first and second parallel sides is parallel or perpendicular to one of said crossed-Nicols.

2. The liquid crystal display unit according to claim 1, further comprising a cut line disposed in at least one of said first and second electrode patterns in a portion corresponding to a side of said pixel, wherein a length of said cut line is at most ⅘ of a length of said side of said pixel.

3. The liquid crystal display unit according to claim 2, wherein said cut line is formed separated from the edge of said at least one of said first and second electrode patterns.

4. The liquid crystal display unit according to claim 1, wherein a type of the liquid crystal display unit is a passive matrix type.

5. A liquid crystal display unit comprising:
    a first substrate and a second substrate opposing each other;
    a first electrode pattern formed on said first substrate;
    a second electrode pattern formed on said second substrate;
    a vertical alignment film formed on at least one of said first and second substrates and covering at least one of said first and second electrode patterns;
    a liquid crystal layer sandwiched between said first and second substrates; and
    a pair of polarizer plates disposed outside said first and second substrates and having crossed-Nicols;
    wherein:
    one of said first and second electrode patterns includes a segment electrode;
    the other of said first and second electrode patterns includes a common electrode;
    said segment electrode and said common electrode cross each other when viewed in plan view;
    an overlapping area of said segment electrode and said common electrode defines a pixel; and
    each of said segment electrode and said common electrode includes a sawtooth pattern comprising a plurality of serially connected teeth with edges of the teeth being parallel and perpendicular to one of said crossed-Nicols.

6. The liquid crystal display unit according to claim 5, wherein assuming that a right direction is 0° and a counter-clockwise direction is positive, one of said crossed-Nicols is 45° and the other is 135°.

7. The liquid crystal display unit according to claim 5, wherein said serially connected teeth of said sawtooth pattern are formed at a pitch of 2 µm to 40 µm.

* * * * *